US009635665B2

(12) United States Patent
Beale

(10) Patent No.: US 9,635,665 B2
(45) Date of Patent: Apr. 25, 2017

(54) METHOD AND APPARATUS FOR TEMPORARILY AND DYNAMICALLY ALLOCATING RADIO RESOURCES TO MACHINE-TYPE-COMMUNICATION DEVICES AND HUMAN-TO-HUMAN DEVICES

(75) Inventor: Martin Beale, Avon (GB)

(73) Assignee: SCA IPLA HOLDINGS INC, New York, NY (US)

( * ) Notice: Subject to any disclaimer, the term of this patent is extended or adjusted under 35 U.S.C. 154(b) by 286 days.

(21) Appl. No.: 13/982,382

(22) PCT Filed: Dec. 13, 2011

(86) PCT No.: PCT/GB2011/052465
§ 371 (c)(1),
(2), (4) Date: Jul. 29, 2013

(87) PCT Pub. No.: WO2012/101394
PCT Pub. Date: Aug. 2, 2012

(65) Prior Publication Data
US 2013/0315215 A1 Nov. 28, 2013

(30) Foreign Application Priority Data

Jan. 28, 2011 (GB) .................................. 1101454.5

(51) Int. Cl.
H04W 72/04 (2009.01)
H04W 72/12 (2009.01)
(Continued)

(52) U.S. Cl.
CPC ... *H04W 72/0446* (2013.01); *H04W 72/1252* (2013.01); *H04W 4/005* (2013.01); *H04W 36/22* (2013.01)

(58) Field of Classification Search
None
See application file for complete search history.

(56) References Cited

U.S. PATENT DOCUMENTS 8,089,911 B2 * 1/2012 Huang ................ H04W 72/005
370/312
8,462,722 B2 * 6/2013 Diachina ............... H04W 48/02
370/329
(Continued)

FOREIGN PATENT DOCUMENTS

CN 101631347 A 1/2010
EP 1 317 103 6/2003
(Continued)

OTHER PUBLICATIONS

3GPP TR 37.868 V0.7.0, "3rd Generation Partnership Project; Technical Specification Group Radio Access Network; Study on RAN Improvements for Machine-type Communications; (Release 10)", LTE 3GPP, Total 25 Pages, (Oct. 2010).
(Continued)

Primary Examiner — Hassan Kizou
Assistant Examiner — Hashim Bhatti
(74) Attorney, Agent, or Firm — Oblon, McClelland, Maier & Neustadt, L.L.P.

(57) ABSTRACT

A method operating a wireless communication system including a radio interface having limited radio resources. The method includes: arranging for one or more communication devices of first type to communicate data to/from a first type source via the radio interface; arranging for one or more communication devices of second type to communicate data to/from a second type source via the radio interface; restricting use of the radio resources by the one or more communication devices of second type during a specified data transmission period by allocating more of the radio resources to the first type of communication devices than the
(Continued)

communication devices of second type; and restricting use of the radio resources by the one or more communication devices of first type outside the specified data transmission period by allocating more of the radio resources to the second type of communication devices than the communication devices of first type.

31 Claims, 12 Drawing Sheets

(51) Int. Cl.
*H04W 4/00* (2009.01)
*H04W 36/22* (2009.01)

(56) References Cited

U.S. PATENT DOCUMENTS

| | | | |
|---|---|---|---|
| 2001/0016499 A1* | 8/2001 | Hamabe | H04W 52/24 455/454 |
| 2009/0225811 A1 | 9/2009 | Albert et al. | |
| 2010/0057485 A1 | 3/2010 | Luft | |
| 2010/0067451 A1 | 3/2010 | Hall | |
| 2010/0067479 A1 | 3/2010 | Choi et al. | |
| 2011/0085497 A1* | 4/2011 | Fang | H04W 48/16 370/328 |
| 2011/0235558 A1 | 9/2011 | Diachina et al. | |
| 2011/0235581 A1 | 9/2011 | Diachina et al. | |
| 2012/0051297 A1* | 3/2012 | Lee | H04W 74/006 370/329 |
| 2012/0063305 A1* | 3/2012 | Chiu | H04W 74/0833 370/230 |

FOREIGN PATENT DOCUMENTS

| | | | |
|---|---|---|---|
| EP | 1317103 A2 * | 6/2003 | H04L 12/56 |
| JP | 2004-32428 A | 1/2004 | |
| JP | 2007-81836 A | 3/2007 | |
| JP | 2007-259041 A | 10/2007 | |
| JP | 2007-300420 A | 11/2007 | |
| JP | 2010-62780 A | 3/2010 | |
| JP | 2010-517334 A | 5/2010 | |
| WO | 96 08939 | 3/1996 | |
| WO | 2005 060357 | 7/2005 | |
| WO | 2011 041459 | 4/2011 | |
| WO | 2011 050669 | 5/2011 | |
| WO | 2011 117823 | 9/2011 | |

OTHER PUBLICATIONS

3GPP TSG-RAN WG2 Meeting #71 R2-104720, "Solutions for MTC overload control for LTE", Nokia Corporation, Nokia Siemens Networks, Total 4 Pages, (Aug. 23-27, 2010).
Great Britain Search Report Issued May 24, 2011 in Application No. GB 1101454.5 Filed Jan. 28, 2011.
International Search Report Issued Apr. 4, 2012 in PCT/GB11/052465 Filed Dec. 13, 2011.
Office Action issued Sep. 8, 2015 in Japanese Patent Application No. 2013-550938.
"Evaluation of bottlenecks for MTC", 3GPP TSG RAN WG2 #69bis R2-102044, Ericsson, St-Ericsson, 6 Pages, (Apr. 12-16, 2010).
Combined Chinese Office Action and Search Report issued Dec. 28, 2015 in Patent Application No. 201180065530.9 (with English Translation of Categories of Documents).
Japanese Office Action issued Feb. 16, 2016 in Patent Application No. 2013-550938.
"TP to 37.868 on Different MTC Approaches" Huawei, R2-104079, 3GPP TSG-RAN WG2 Meeting #70bis, Jun. 28-Jul. 2, 2010, 2 Pages and cover page.
"Text Proposal on Possible Solution for RAN Overload Control" CATT, R2-104610, 3GPP TSG RAN WG2 Meeting #71, Aug. 23-27, 2010, 2 Pages and cover page.
"Text Proposal for TR 37.868 on Access Barring Scaling for MTC" Deutsche Telekom, MediaTek, R2-105215, 3GPP TSG-RAN WG2 Meeting #71, Aug. 23-27, 2010, 3 Pages and cover page.
U.S. Appl. No. 13/983,673, filed Aug. 5, 2013, MacNamara, et al.
U.S. Appl. No. 13/983,587, filed Aug. 5, 2013, MacNamara, et al.

* cited by examiner

METHOD AND APPARATUS FOR TEMPORARILY AND DYNAMICALLY ALLOCATING RADIO RESOURCES TO MACHINE-TYPE-COMMUNICATION DEVICES AND HUMAN-TO-HUMAN DEVICES

TECHNICAL FIELD

The present invention relates to radio communication networks and methods for transmitting and receiving data from a first type of source and data from a second type of source.

In some embodiments the data from the first type of source is generated by machines, the data being machine type communication (MTC) data and the data from the second type of source is human-to-human (H2H) data originating from human users.

BACKGROUND OF THE INVENTION

As mobile telecommunications technology develops to allow data to be transmitted with increased reliability, at faster speeds and over wider areas, the number of applications that can usefully exploit this technology increases. As a result it becomes increasingly clear that a distinction can be drawn between different types of mobile radio technology use.

Traditionally, mobile telecommunications networks were developed to allow human users using mobile handsets to hold telephone conversations, in other words "voice calls", with other human users. More recently further services, such as the short message service (SMS) were provided enabling users to exchange text based messages. More recently still, mobile data services were developed enabling users to gain access to online communication services such as email communication, instant messaging, video calls and so on. This type of communication supported by mobile radio technology can be broadly classed as "human-to-human" (H2H) communication as it typically involves facilitating the communication of data in one form or another that is created and consumed by human users between two or more communication devices.

In contrast, another class of data communication has developed which takes advantage of mobile radio technology but does not typically involve the communication of data that is created and consumed by human users. This type of data communication normally involves the communication of data between autonomous machines. In other words the generation, transmission and reception of the data occurs without any human intervention. This type of communication is classed as "machine to machine" (M2M) communication or "machine type communication" (MTC). Examples include the transmission of telemetry data from remote sensors to a central processing server. More specific examples include so-called "smart meters" which generate data concerning the consumption of a utility such as gas, electricity or water and transmit this data back to a central server.

As will be appreciated, providing an arrangement in which MTC communication devices can communicate MTC data in a mobile radio network which is shared with H2H communication devices can present a technical problem in respect of making a most efficient use of the resources available to the mobile radio network.

SUMMARY OF INVENTION

In accordance with a first aspect of the invention there is provided a method of operating a wireless communication system having a radio interface which has limited radio resources. The method comprises arranging for one or more communication devices of a first type to communicate data to and from a first type of source via the radio interface;

arranging for one or more communication devices of a second type to communicate data to and from a second type of source via the radio interface;

restricting use of the radio resources by the one or more communication devices of the second type during a specified data transmission period by allocating more of the radio resources to the first type of communication devices than the communication devices of the second type; and restricting use of the radio resources by the one or more communication devices of the first type outside of the specified data transmission period by allocating more of the radio resources to the second type of communication devices than the communication devices of the first type.

Conventional mobile telecommunications systems and techniques support the transmission of H2H data and MTC data either by allowing H2H and MTC data transmitting elements, such as base stations and mobile devices, to access radio resources (such as uplink frequencies, time slots, codes and so on) as and when required, or by reserving specific radio resources for one type of data only, for example arranging a network so that only either MTC data or H2H data can be transmitted on a particular frequency carrier.

However, as a mobile telecommunications network operator is normally only licensed to use a portion of the available radio spectrum, it is important to use this spectrum as efficiently as possible. In some situations, simply sharing radio resources between MTC and H2H data transmission, or applying a rudimentary allocation of one type of data transmission to one frequency carrier may not provide the most efficient use of available radio resources.

Conventional mobile radio communication techniques typically either share radio resources between H2H communication devices and MTC communication devices by permitting access to the radio resource as and when the devices request access or permanently allocating a radio resource to one type of device. However, this approach can lead to an inefficient use of radio resources.

In accordance with the first aspect of the invention, communication devices of a first type using for example a first communication type, such as MTC communication devices using a GPRS based radio communication system, and communication devices of a second type using for example a second communication type, such as H2H communication devices using for example an LTE based radio communication system, gain access to a radio resource in a "time-multiplexed" fashion. For example, a period may be specified during which a designated radio resource, for example a pre-allocated frequency band, is used for the transmission of MTC data using a GPRS radio access technology whilst the transmission of H2H data using a LTE radio access technology using the designated radio resource is restricted allowing MTC data to be transmitted. Correspondingly, outside of this period the transmission of MTC data on the pre-allocated frequency band using the GPRS radio access technology is restricted thereby allowing H2H data to be transmitted on the pre-allocated frequency band using the LTE radio access technology. Using this approach, a more flexible use of radio resources is possible, for example allowing the proportion of radio resources dedicated to either H2H or MTC data transmission to be readily varied based on network conditions such as traffic loading of one of the types of data transmission or other considerations such as relative priority of different types of data.

In one example the radio resource is a radio carrier on which an uplink of the radio interface and a downlink of the radio interface can be transmitted and the specified data transmission period occurs at a predetermined time and for predetermined length of time based on predicted levels of H2H data transmission.

MTC data is such that it may often be delay tolerant. In other words, it will not matter if there is a delay between the MTC data being generated and it being received at an MTC application server within a certain time. On the other hand the transmission of H2H data is such that it is typically not tolerant of delay. In other words, H2H data should be transmitted and received as soon as possible after it has been generated because it is being transmitted to a human user. However, another characteristic of H2H data transmission is that it tends to reduce in volume in correspondence with human activity cycles. In other words traffic volume is at its highest during the day when most users are awake and at its lowest level at night when most users are asleep. This example takes advantage of these factors in that during a period when human activity is at its highest, use of the radio carrier for MTC data transmission is restricted thereby increasing the amount of resource available for the delay intolerant H2H data. On the other hand, when H2H data transmission volume falls, the use of the radio resource is restricted for H2H data transmission allowing the MTC data to be transmitted. The H2H data may then typically be transmitted by another radio carrier during this period.

In another example, during a predefined handover period prior to the predetermined time, the H2H communication devices are controlled to cease transmitting H2H data on the radio carrier and instead transmit H2H data on a second radio carrier.

In accordance with this example, the H2H communication devices are handed over to a second radio carrier in a period leading up to the point at which the radio carrier is to be used for MTC data transmission. Specifying a predefined handover period ensures that H2H devices can be switched to using the second carrier in a gradual and controlled manner rather than abruptly switching a potentially high number of communication devices from using one carrier to another which could lead to an overload of various network components.

In another example, each MTC communication device is allocated one or more specific sub-periods during the specified data transmission period within which to transmit MTC data. In some examples this may be using a specific communication type (e.g. radio access technology) such as a GPRS based communication technology.

During the period in which the MTC communication devices have been restricted from using the radio carrier, a great deal of MTC data may have accumulated for transmission. If, as soon as the radio carrier becomes available for MTC data transmission, all the MTC communication devices attempt to transmit their data, this could lead to an overload of various network components. By specifying sub-periods during which specified MTC communication devices can transmit data (for example using a GPRS based communication technology), the transmission of MTC data is spread out thereby reducing the likelihood of network components being overloaded.

In another example, rather than the radio resource comprising a radio carrier, instead the radio resource comprises one or more sub-frames of an uplink transmission frame on which data is transmitted from the one or more H2H and MTC communication devices on the radio interface and further comprises one or more sub-frames of a downlink transmission frame on which data is transmitted to the one or more H2H and MTC communication devices on the radio interface. In addition, the specified data transmission period comprises sub-frames during which MTC data is transmitted, for example using a first communication technology such as a GPRS radio access technology and the period outside the specified data transmission period comprises sub-frames during which H2H data is transmitted, for example using second communication technology such as a LTE radio access technology.

In accordance with this example, the sub-frames of an uplink and downlink transmission frame are allocated for the transmission of H2H data and MTC data. Accordingly, the radio resource (in other words the uplink and downlink transmission frames) is multiplexed between H2H and MTC data communication on a sub-frame, by sub-frame basis. This allows the proportion of radio resource allocated to either MTC or H2H communication to be readily and rapidly changed.

Further aspects and features of the invention are defined in the claims.

BRIEF DESCRIPTION OF THE DRAWINGS

Embodiments of the present invention will now be described by way of example only with reference to the accompanying drawings where like parts are provided with corresponding reference numerals and in which:

FIGS. 4b and 4c show, respectively, schematic diagrams of an H2H communication device and an MTC communication device arranged to transmit data in the communication system shown in FIG. 4a;

FIG. 5 provides a schematic diagram illustrating how carrier allocation timing information can determine how data is transmitted in the communication system shown in FIG. 4a;

DESCRIPTION OF EXAMPLE EMBODIMENTS

Machine type communication (MTC) data and human-to-human (H2H) type data can be transmitted using any suitable radio telecommunications technology. Accordingly, the examples set out below have been disclosed in terms of a generic mobile network technology. It will be therefore understood that the principles of the present invention can be implemented using any suitable radio telecommunications technology and using any suitable network architecture, for example GSM, GPRS, W-CDMA (UMTS), CDMA2000, LTE and so on.

Conventional H2H and MTC Networks

Figure 1:
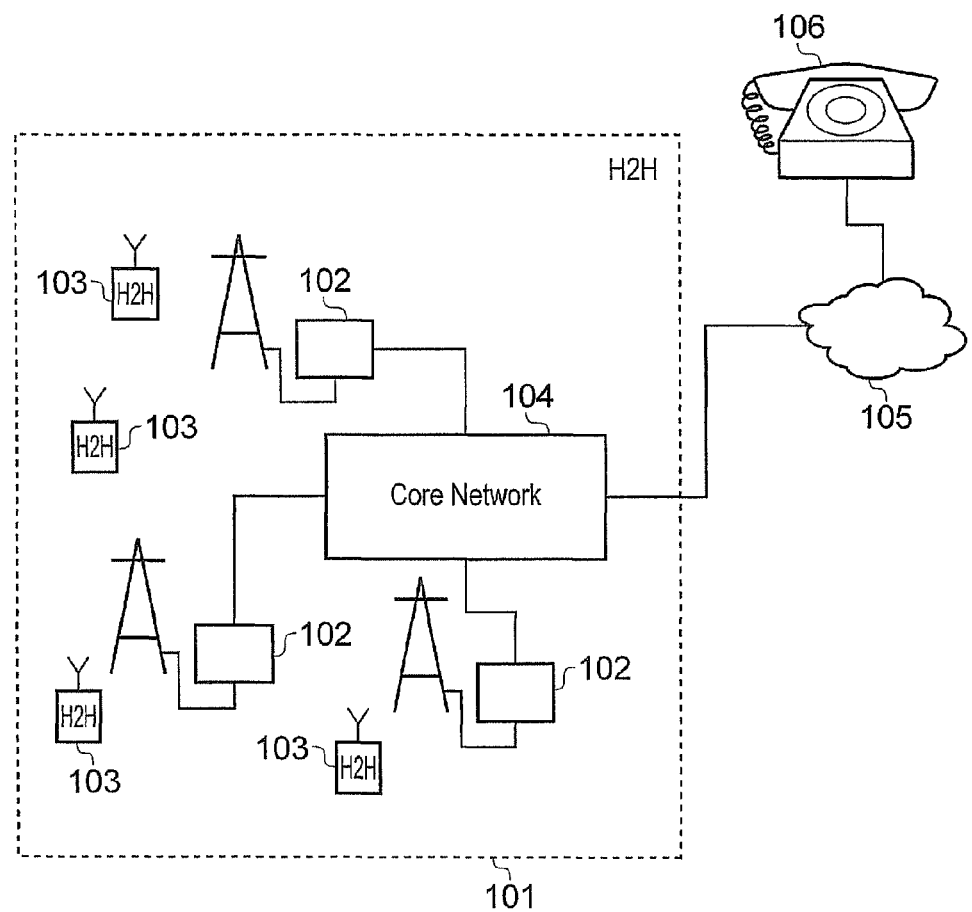
FIG. 1 provides a schematic diagram of a generalised example of a conventional human-to-human (H2H) communication system.

FIG. 1 provides a schematic diagram of a generalised example of a conventional human-to-human (H2H) communication system. The H2H communication system supports "human-to-human" communication such as voice communication between two users. The H2H communication system includes an H2H mobile radio network 101. The H2H mobile radio network 101 includes a plurality of H2H base stations 102 which are arranged to transmit H2H data to a plurality of H2H communication devices 103 via a radio interface downlink and receive H2H data from the H2H communication devices 103 via a radio interface uplink. The H2H mobile radio network is typically divided into a number of different geographic cells wherein a given cell is served by a particular base station. The H2H mobile radio network 101 also includes a core network part 104 which routes data to and from the H2H communication devices and performs known network functions such as authentication, mobility management, service provisioning, billing and so on.

The H2H core network 104 includes a gateway function (not shown) providing means to connect with other H2H communication elements via an external network 105 such as a public switched telephone network (PSTN) or other mobile radio networks. To illustrate typical H2H data communication, the H2H communication system shown in FIG. 1 includes a link between the core network 104 and via the external network 105 to a conventional fixed-line telephone 106. Accordingly, the H2H communication system shown in FIG. 1 allows a first user using the fixed-line telephone 106 and a second user using an H2H communication device 103 to hold a voice call.

Figure 2:
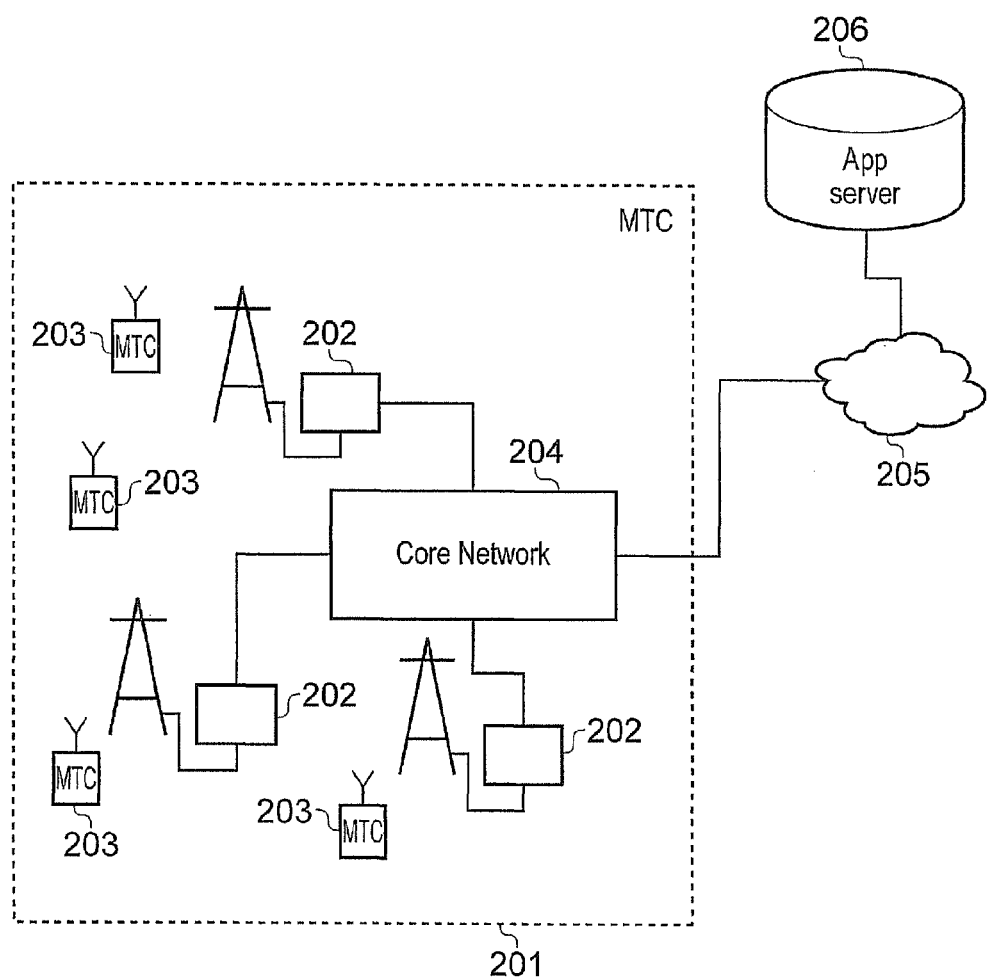
FIG. 2 provides a schematic diagram of a generalised example of a conventional machine type communication (MTC) system.

FIG. 2 provides a schematic diagram showing a conventional machine type communication (MTC) system. The MTC communication system shown in FIG. 2 includes an MTC mobile radio network 201 which functions in a similar way to the H2H mobile radio network shown in FIG. 1. The MTC mobile radio network 201 includes a plurality of MTC base stations 202 which are arranged to transmit MTC data to a plurality of MTC communication devices 203 via a radio interface downlink. As will be understood, the communication type (e.g. the radio access technology) used for communicating between the base station 202 and the MTC communication device 203 may be different to the communication type used for communicating between the H2H base station 102 and the H2H communication device 103. The MTC base stations 202 are arranged to receive MTC data from the MTC communication devices 203 via a radio interface uplink. The MTC mobile radio network 101 includes an MTC core network part 204 which routes data to and from the MTC communication devices. The MTC core network 204 is connected via an external network 205 such as interne network with an MTC application server 206. The MTC communication system shown in FIG. 2 allows MTC data to be transmitted from the MTC communication devices 203 to the MTC application server 206.

Although not shown in FIG. 2, in some examples the MTC communication system might be part of an H2H communication system in which the H2H devices and MTC communication devices are arranged to share resources. For example, the base stations communicate with both H2H communication devices and MTC communication devices using the same radio access technology and H2H data and MTC data is routed through the same core network. However, for the sake of clarity, a combined MTC/H2H network is not shown.

As is known in the art, in order to allow multiple mobile radio networks, such as the H2H mobile radio network 101 and the MTC mobile radio network 201 illustrated in FIGS. 1 and 2, to operate simultaneously over the same geographical region, each mobile radio network is allocated part of the frequency spectrum on which base stations and communication devices belonging to that radio network can transmit data. This concept is illustrated in FIG. 3.

Figure 3:
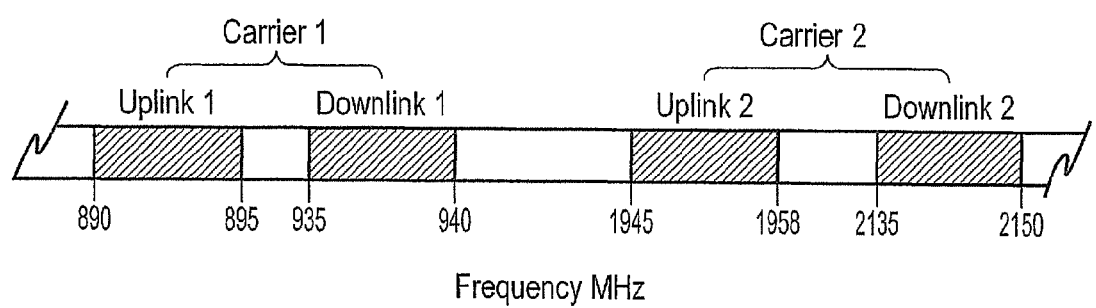
FIG. 3 provides a schematic diagram illustrating an example of mobile radio network frequency spectrum allocation.

FIG. 3 provides a schematic diagram illustrating an example of mobile radio network frequency spectrum allocation. The section of the frequency spectrum allocated to a particular network allowing an uplink and downlink to be supported is referred to as "a carrier". In some instances, such as spectrum allocation for frequency division duplex (FDD) systems, the frequency allocation may include two discrete sections of the spectrum, a first section for the uplink and a second section for the downlink. In other instances, such as spectrum allocation for some time division duplex system such as TD SCDMA, each carrier may comprise a single section of the spectrum whereby the uplink data is transmitted in a first group of time slots and downlink data is transmitted in a second group of time slots.

FIG. 3 shows an example FDD type frequency allocation in which a first carrier "Carrier 1" includes a first section of the spectrum allocated for uplink transmission between 890 and 895 MHz and a second section of the spectrum allocated for downlink transmission between 935 and 940 MHz. A second carrier "Carrier 2" includes a third section of the spectrum allocated for uplink transmission between 1945 and 1958 MHz and a fourth section of the spectrum allocated for downlink transmission between 2135 and 2150 MHz.

When using techniques such as carrier aggregation in LTE systems, the term "carrier" may in fact refer to several non-contiguous sections of frequency spectrum (e.g. several conventional carriers) that are aggregated together as is known in the art. Accordingly reference to Carrier 1 and Carrier 2 below is not limited necessarily to a continuous section of radio resource conventionally referred to as a carrier but may refer to any suitable designation of radio resources.

In a conventional example, Carrier 1 might be allocated to an H2H mobile radio network 101 such as that shown in FIG. 1 enabling the H2H communication devices 103 to transmit data to the H2H base stations (i.e. the uplink) on radio signals transmitted using frequencies between 890 and 895 MHz; and enabling the H2H base stations 102 to transmit data to the communication devices 103 (i.e. the downlink) on radio signals transmitted using frequencies between 935 and 940 MHz. In this example Carrier 2 might be allocated to an MTC mobile radio network 201 such as that shown in FIG. 2 (or a combined H2H/MTC mobile radio network), enabling the MTC communication devices 203 to transmit data to the MTC base stations 203 (i.e. the uplink) on radio signals transmitted using frequencies between 1945 and 1958 MHz; and enabling the MTC base stations 102 to transmit data to the MTC communication devices 203 (i.e. the downlink) on radio signals transmitted using frequencies between 2135 and 2150 MHz.

However, the division of carriers whereby a single carrier is dedicated to the transmission of H2H data and a single carrier is dedicated to the transmission of MTC data; or one or both carriers are simply shared for the transmission of MTC and H2H data may not provide the optimum usage of radio resources, particularly taking into account the different characteristics of MTC data transmission and H2H data transmission.

Macro Level Time Domain Multiplexing of MTC and H2H Communications

In many examples MTC data may be delay tolerant. In other words, providing that transmitted MTC data eventually reaches the intended MTC application server, it may not matter if the time between the generation of the MTC data and the reception of the MTC data at the application server is a few minutes or even a few hours. For example, an MTC communication device might be connected to a utility meter which records a user's consumption of a resource such as gas, electricity or water. Consumption data is generated at regular intervals, for example once a week, and then transmitted to an MTC application server that generates a bill. If the user is billed once every few months, it is unlikely that it will matter if the transmission of the consumption data is delayed by a few hours.

In contrast, it is typically desirable for H2H data to be communicated across an H2H communication system with as short a delay as possible. For example, delay in the transmission of a data packet containing data relating to a voice call between two users cannot usually be tolerated beyond a small fraction of a second.

A further characteristic of the transmission of H2H data is that traffic volume tends to correspond with human activity cycles. In other words, the volume of H2H data tends to be highest during periods of the day when a majority of users of the H2H communication system are awake and active, and tends to be lowest during periods of the day when a majority of the users are asleep and therefore inactive. In contrast, MTC data traffic volume is not typically dependent on human activity patterns.

Figure 4A:
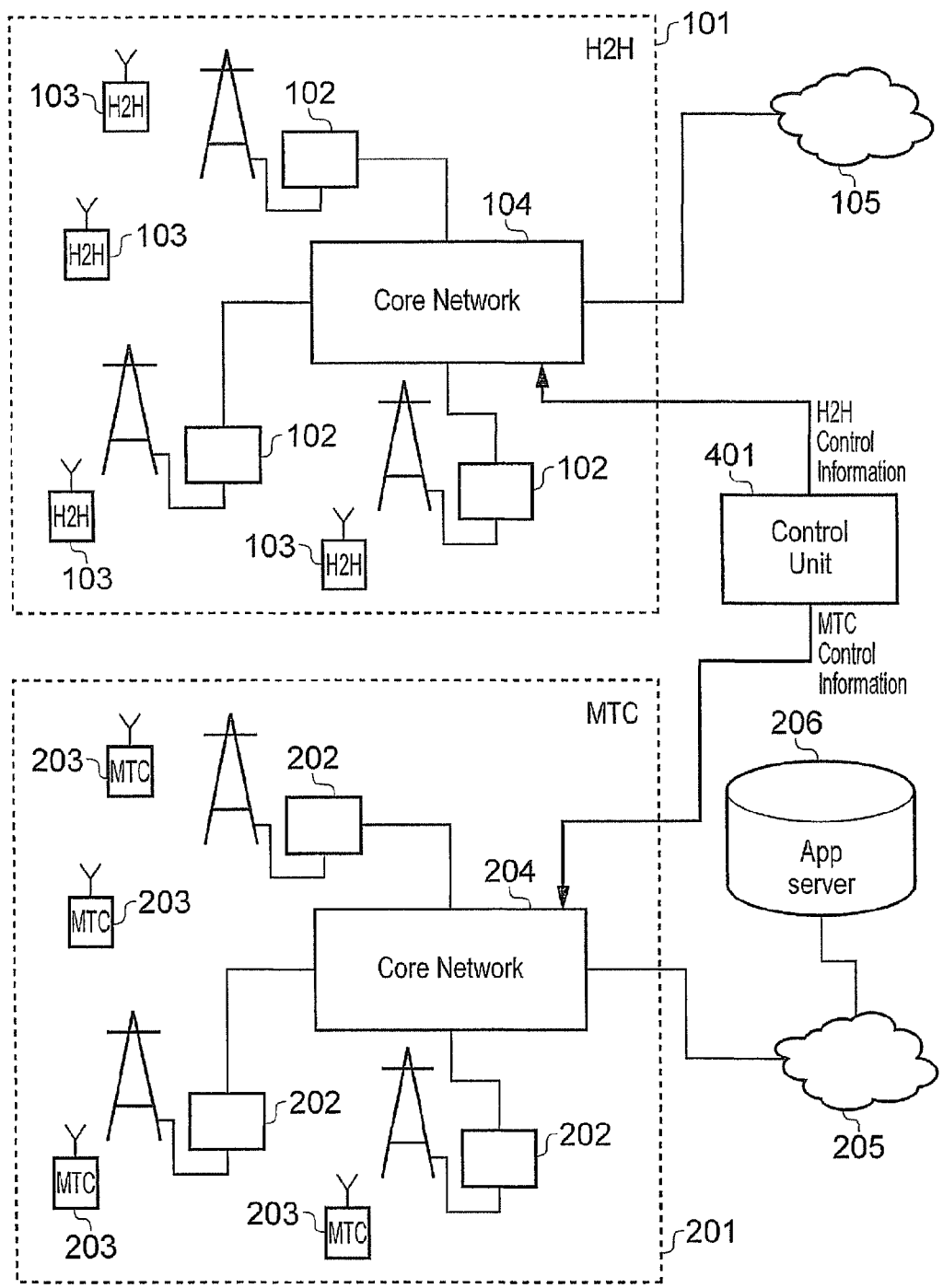
FIG. 4a provides a schematic diagram providing an illustration of a communication system arranged to use radio resources with increased efficiency.
Figure 4B:
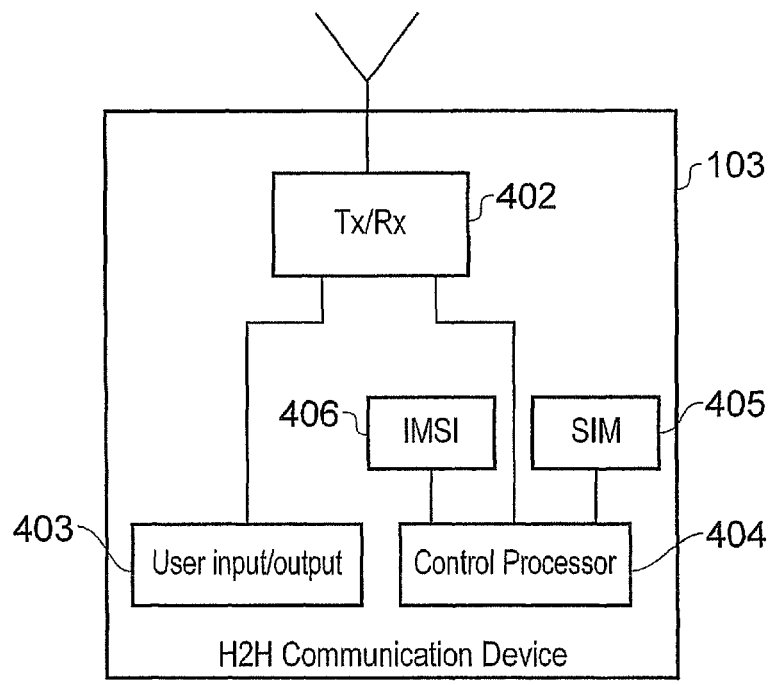
Figure 4C:
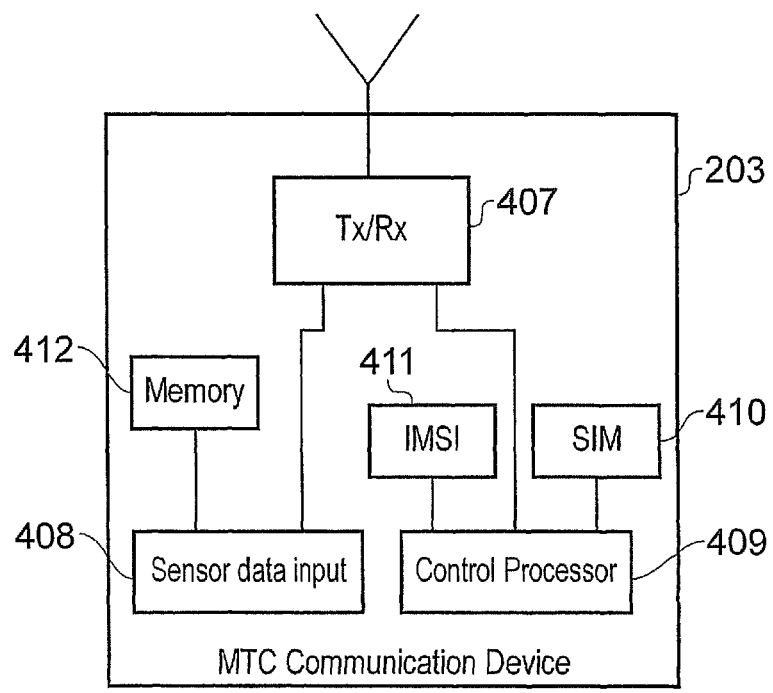

FIG. 4a provides a schematic diagram providing an illustration of a communication system which exploits these characteristics to use radio resources with increased efficiency. FIGS. 4b and 4c show schematic diagrams of an H2H communication device and an MTC communication device arranged to transmit data in the communication system shown in FIG. 4a.

FIG. 4a shows an H2H mobile radio network which corresponds to the H2H mobile radio network 101 explained with reference to FIG. 1. The H2H base stations 102 and the H2H communication devices 103 shown in FIG. 4a are arranged to be able to transmit and receive data on multiple carriers. For example, as will be explained in further detail, the H2H communication devices 103 can be controlled by the H2H core network 104 to transmit data on either of the uplink frequencies (Carrier 1 or Carrier 2) shown in FIG. 3 and can be controlled to receive data on either of the downlink frequencies (Carrier 1 or Carrier 2) shown in FIG. 3. Correspondingly, the H2H base stations 102 shown in FIG. 4a can be controlled by the core network 104 using conventional techniques to transmit data on either of the downlink frequencies shown in FIG. 3 and to receive data on either of the uplink frequencies shown in FIG. 3.

FIG. 4a also shows an MTC mobile radio network which corresponds to the MTC mobile radio network 201 explained with reference to FIG. 2. The MTC base stations 202 and the MTC communication devices 203 are controlled so as to transmit and receive data on a single carrier. For example the MTC communication devices 203 transmit data on the uplink frequency of Carrier 1 and receive data on the downlink frequency of Carrier 1 as shown in FIG. 3. Correspondingly, the MTC base stations 202 transmit data on the downlink frequency of Carrier 1 and receive data on the uplink frequency of Carrier 1 shown in FIG. 3.

Typically, the H2H mobile radio network and the MTC mobile radio network are arranged to use different radio access technologies. For example, the H2H mobile radio network might communicate data using a GSM based system and the MTC mobile radio network might communicate using a UMTS based system. Alternatively, the H2H mobile radio network might communicate data using a LTE based system and the MTC mobile radio network might communicate using a GPRS based system.

However, in some examples the H2H mobile radio network and the MTC mobile radio network might be arranged to communicate using the same radio access technology. For example, both the H2H mobile radio network and the MTC mobile radio network might communicate using a UMTS based system.

Although shown separately in FIG. 4a, in some examples, both where the H2H mobile radio network and MTC mobile radio network use the same or different radio access technologies, the H2H mobile radio network 101 and the MTC mobile radio network 201 may in fact be part of the same mobile communication radio network. In other words the H2H core network 104 and the MTC core network 204 form a single integrated core network and the H2H base stations 102 and the MTC base station 204 are either co-located or are not actually physically distinct from each other.

FIG. 4b shows a schematic diagram providing a more detailed view of an H2H communication device 103 such as one of those shown in FIG. 4a. As will be appreciated, many functional aspects of the H2H communication device 103 have been omitted for the sake of brevity but will be known by those skilled in the art.

The H2H communication device 103 includes a transceiver unit 402 arranged to transmit radio signals to an H2H base station 102 and arranged to receive radio signals transmitted from an H2H base station 102. The H2H communication device 103 also includes a user input/output unit 403 connected to the transceiver unit 402. The user input/output unit 403 is arranged to extract downlink user data from the radio signals received by the transceiver unit 402 and convert them into appropriate user data output. For example, the user input/output unit 403 can convert downlink user data extracted from the received radio signals into an audible output. The user input/output unit 403 is also arranged to convert user input into uplink user data that is sent to the transceiver unit 402 and transmitted from the H2H communication device 103 as a radio signal. For example, the user input/output unit 403 can convert audible input from a user (e.g. sound spoken into a microphone) into uplink user data which is then sent to the transceiver unit 402 and then transmitted to the network.

The H2H communication device 103 also includes a control processor 404 which controls the operation of the H2H communication device 103 and in particular controls the transceiver unit 402. The control processor 404 controls when uplink data is transmitted from the H2H communication device 103 and the manner in which the uplink data is transmitted. For example, the control processor 404 controls on what frequencies uplink data is transmitted and which radio access technology is used.

The control processor 404 is also arranged to extract downlink control data from the radio signals received by the transceiver unit 402. The control processor 404 is arranged to control the transmission of uplink data from the H2H communication device 103 in accordance with the extracted downlink control data. For example, the control data might indicate on what frequency and at what points in time the control processor 404 should control the transceiver unit 402 to transmit uplink data. The downlink control data extracted by the control processor 404 may also provide an indication of the manner in which downlink data is transmitted by the H2H base stations 102 of the H2H network enabling the control processor 404 to control the way in which the transceiver unit 402 receives data transmitted by the H2H base stations. For example, the control processor may determine from the downlink control data timing and synchronisation information for receiving downlink data.

The H2H communication device also comprises a subscriber identity module (SIM) 405 connected to the control processor 404 and an IMSI module 406 comprising an International Mobile Subscriber Identity number. The function of the SIM 405 and the IMSI module are well known in the art and shall not be explained further.

FIG. 4c shows a schematic diagram providing a more detailed view of an MTC communication device 203 such as one of those shown in FIG. 4a. The MTC communication device 203 includes a transceiver unit 407, control processor 409, SIM 410 and IMSI module 411 which correspond functionally with transceiver unit 402, control processor 404, SIM 405 and IMSI module 406 explained with reference to the H2H communication device 103 shown in FIG. 4b. It will be understood that if the H2H communication device 103 and the MTC communication device 203 are arranged to communicate using different radio access technologies, then the various components (such as the control processor 409 and the transceiver 407) shown in FIG. 4c will not correspond exactly with those shown in FIG. 4b although for the purposes of explanation the components can be considered to be broadly equivalent.

Unlike the H2H communication device 103, the MTC communication device 203 includes a sensor data input unit 408 which is arranged to receive MTC sensor data input and a memory unit 412 connected to the sensor data input unit 408. The sensor data input unit 408 is arranged to convert this sensor data into uplink MTC data and send this data to the transceiver unit 407 for transmission to the MTC network. As explained above, the control processor 409 is arranged to control when the transceiver unit 407 transmits the uplink MTC data. If the sensor data input unit 408 sends MTC data to the transceiver unit 407 for transmission but the control processor 409 has controlled the transceiver unit 407 so as not to transmit any data at that point in time, then unsent data is stored in the memory unit 412 for transmission at a later time.

Returning to FIG. 4a, the communication system includes a control unit 401 connected to the H2H core network 104 and the MTC core network 204. The control unit 401 is arranged to send control information to the H2H core network 104 and the MTC core network 204. The H2H core network 104 and the MTC core network 204 are arranged to adapt the communication of data from the communication devices and the base stations in accordance with the control information sent from the control unit 401.

In one example the control information sent from the control unit 401 to each of the core networks comprises carrier allocation timing infatuation. More specifically, the carrier allocation timing information sent to the MTC core network 204 indicates a predetermined period during which the MTC communication devices 203 and the MTC base stations 202 can transmit data. The carrier allocation timing information sent to the H2H core network 104 indicates a predetermined period during which the H2H communication devices 103 and the H2H core network 104 can transmit data and on what carrier.

In one example, the carrier allocation timing information sent from the control unit 401 to the MTC core network 204 indicates that the core network should only permit the transmission of data from the MTC communication devices 203 and the MTC base stations 202 on Carrier 1 and only between the hours of 0000 hrs and 0559 hrs. This period corresponds to a period during which many of the human users of the H2H communication system are asleep and therefore H2H communication traffic is at a lower level.

Correspondingly, the carrier allocation timing information sent from the control unit 401 to the H2H core network 104 indicates that transmission of H2H data by the H2H communication devices 103 and the H2H base stations 102 should only be permitted between the hours of 0600 hrs and 2359 hrs on Carrier 1. This period corresponds to a period during which many of the human users of the H2H communication system are awake and therefore H2H communication traffic is at a higher level. The carrier allocation timing information sent from the control unit 401 to the H2H core network 104 also indicates that the H2H communication devices 103 and the H2H base stations 102 can transmit H2H data on Carrier 2 at all times.

Figure 5:
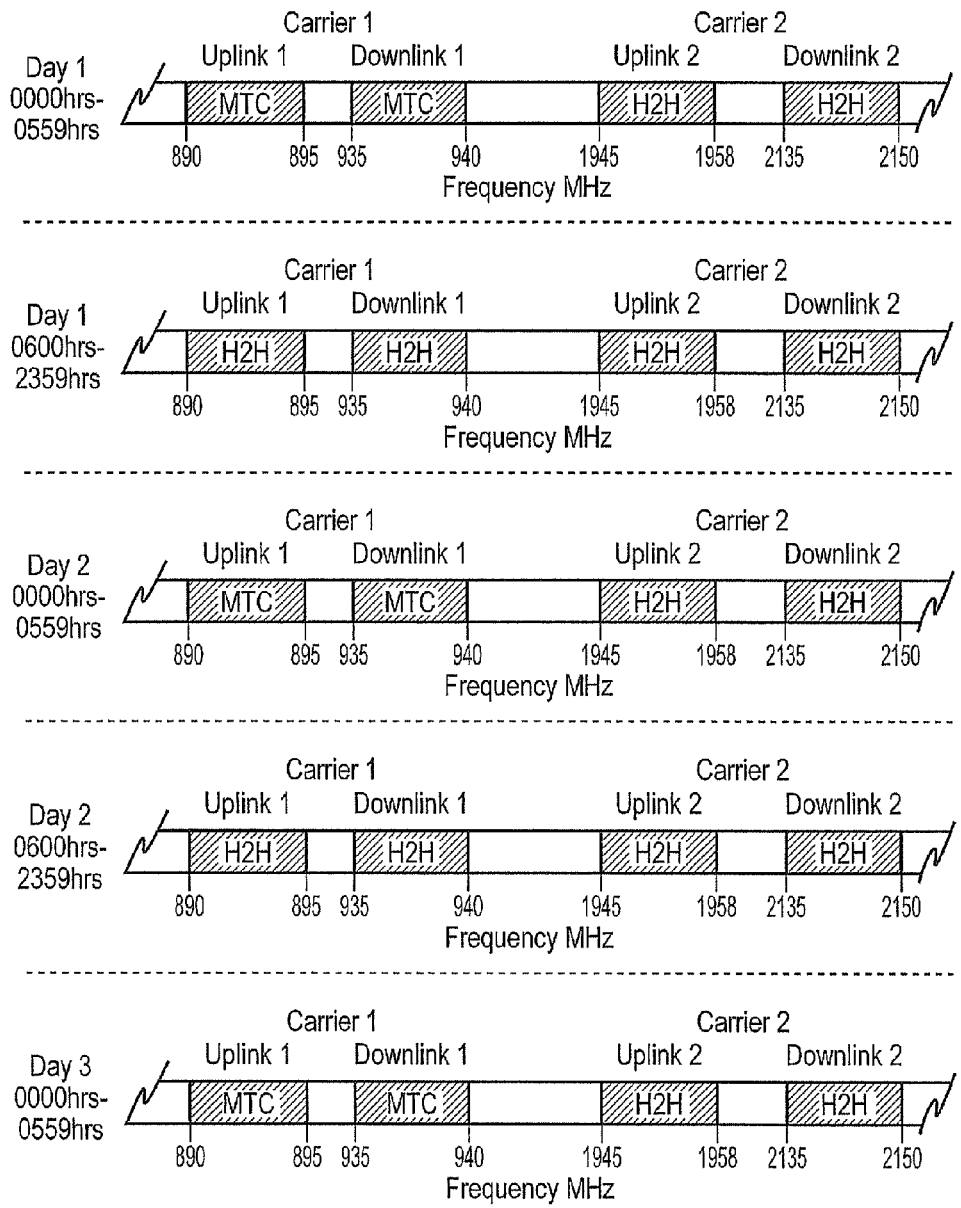

FIG. 5 provides a schematic diagram illustrating how the carrier allocation timing information sent from the control unit determines how data is transmitted on Carrier 1 and Carrier 2.

As can be seen from FIG. 5, on day 1 between the hours of 0000 hrs and 0559 hrs, the uplink and downlink frequencies of Carrier 1 are used for the transmission of MTC data only. On day 1 between the hours of 0600 hrs and 2359 hrs the uplink and downlink frequencies of Carrier 1 are used for the transmission of H2H data only. On day 2 between the hours of 0000 hrs and 0559 hrs the uplink and downlink frequencies of Carrier 1 are used for the transmission of MTC data only. On day 2 between the hours of 0600 hrs and 2359 hrs the uplink and downlink frequencies of Carrier 1 are used for the transmission of H2H data only. On day 3 between the hours of 0000 hrs and 0559 hrs the uplink and downlink frequencies of Carrier 1 are used for the transmission of MTC data only and so on.

Over the entire period shown in FIG. 5, the uplink and downlink carrier frequencies of carrier 2 are used only for the transmission of H2H data.

As explained above, the MTC data is typically transmitted using a first radio access technology such as GPRS and the H2H data is typically transmitted using a second radio access technology such as LTE. However in other examples, the MTC data and the H2H data may be transmitted using the same radio access technology but optimised for the transmission of either H2H data or MTC data. For example, if both the MTC data and H2H data are transmitted using LTE, when transmitting MTC data a greater proportion of the physical radio resources may be allocated to the Physical Downlink Control Channel (PDCCH) and the Random Access Channel (RACH) thereby providing more radio resource for the frequent transmission of small quantities of data from different communication devices characteristic of MTC data transmission. On the other hand, when transmitting H2H data a greater proportion of the physical radio resources may be allocated to the Downlink Shared Channel (DSCH) thereby providing more for radio resource for the transmission of data to individual communication devices.

When allocating radio resources such as carrier frequencies in conventional communication systems, there is no distinction between the time at which MTC data and H2H data are sent. For example, the conventional MTC communication system shown in FIG. 2 communicates MTC data at all times on Carrier 2 and the conventional H2H communication system shown in FIG. 1 communicates H2H data at all times on Carrier 1. Accordingly, at times of high H2H data traffic (e.g. during the middle of the day), it is possible that in some cells, the total amount of H2H traffic that a single carrier is able to support may not be sufficient to support the transmission of all the H2H data that users attempt and therefore either quality of service within the H2H communication system may drop or it may be impossible to transmit some of the H2H data.

In the communication system shown in FIG. 4a operating in accordance with the carrier allocation indicated in FIG. 5, the efficiency with which radio resources are used is improved: during periods where there is likely to be the highest level of H2H traffic (e.g. between 0600 hrs and 2359 hrs) all the available resources are allocated to the transmission of H2H data thus reducing the likelihood of a reduction in quality service or failed H2H data transmissions due to high H2H data volumes. Then, during periods where there is likely to be the lowest level of H2H traffic (e.g. between 0000 hrs and 0559 hrs) Carrier 2 is used for the transmission of MTC data thus ensuring that there is an opportunity to transmit the MTC data that might otherwise have been transmitted during the first period (e.g. 0600 hrs and 2359 hrs).

In some scenarios, the MTC mobile radio network and the H2H mobile radio network may be operated by different telecommunications operators. A first operator may operate the H2H mobile radio network and own the rights to use Carrier 1 and Carrier 2 for communicating telecommunications data. A second operator my operate the MTC mobile radio network and "lease" Carrier 1 from the first operator for use in the MTC mobile radio network during periods where traffic in the H2H mobile radio network is low, for example between 0000 hrs and 0559 hrs as discussed above.

In order to implement the system shown in FIG. 4a, the H2H communication devices and the MTC communication devices need to be aware when, and on what carrier MTC/H2H data can be transmitted and received. As explained generally with respect to FIGS. 4b and 4c, this is achieved by the control processor of each communication device decoding control data received from the network. However, more specifically, in some examples this information is transmitted to each communicating device in an adapted synchronisation signal. The adapted synchronisation signal is discussed in further detail below.

On the other hand, in other examples such as systems in which the H2H mobile radio network and MTC mobile radio network use the same radio access technology, each MTC communication device may not receive signalling explicitly indicating when and on which carrier MTC data can be transmitted. Instead, each MTC communication device is arranged to request to transmit MTC data as and when it is generated at the MTC communication device. However, if an MTC communication device sends an access request requesting to transmit MTC data during a period in which no carriers are allocated for the transmission of MTC data, for example between the hours of 0600 hrs and 2359 hrs, the radio network sends signalling to the MTC communication device denying the access request but including re-attempt timing information indicating a later time, for example a specified time between 0000 hrs and 0559 hrs, when the MTC communication device should re-try sending the MTC data. This information is then stored in the MTC communication device and at the specified later time the MTC communication device sends the MTC data.

As explained above, MTC data is typically delay tolerant. However, some classes of MTC data may be delay intolerant. For example, an MTC communication device might be connected to a temperature sensor that measures the temperature of a building and transmits temperature readings back to a temperature monitoring application server. A temperature reading indicating a sudden unexpected rise in temperature may indicate a fire has started. Transmitting this data back to the temperature application server should be delayed as little as possible. Accordingly, in some examples the MTC communication devices are arranged to distinguish between high priority and low priority MTC data and ensure that high priority data is transmitted with as short a delay as possible. For example, with reference to FIG. 4c, if the sensor input data unit 407 sends high priority MTC data to the transceiver unit 402 during a period in which no carrier has been allocated for the transmission of MTC data, the control processor 404 may nevertheless control the transceiver unit to transmit the high priority MTC data on any available carrier.

Dynamic Macro Level Time Domain Multiplexing of MTC and H2H Communications

In the example described with reference to FIG. 4a and FIG. 5, the time at which Carrier 1 is allocated for the transmission of MTC data is determined by pre-specified criteria, i.e. predicted human activity cycles. However, H2H traffic volume may be affected by other factors. For example, during periods such as national holidays H2H traffic normally generated as a result of users being at work may be reduced. Alternatively, a popular sporting event could result in a reduced level of H2H traffic as a large number of H2H users are pre-occupied with watching coverage of the sporting event on television rather than, for example, taking part in voice calls. Accordingly, in some examples, the frequency allocation may also be made on a dynamic basis. In other words, as well as sending carrier allocation timing information to the H2H core network 104 and the MTC core network 204 to control at what predetermined times Carrier 1 is to be used for the transmission of MTC data, Carrier 1 can also be allocated to the transmission of MTC data on a dynamic basis.

Figure 6:
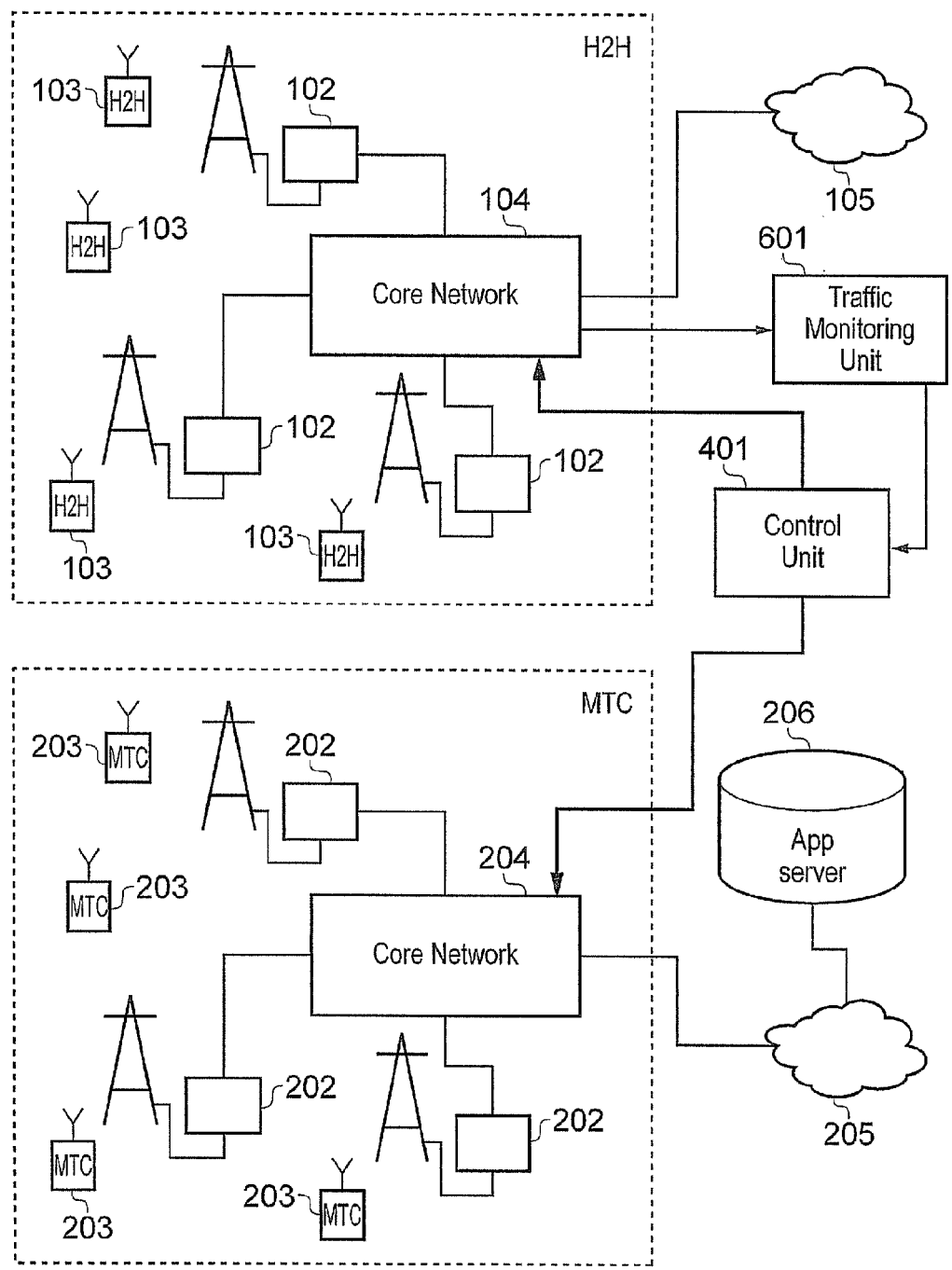
FIG. 6 provides a schematic diagram providing an illustration of a communication system which dynamically allocates carriers on the basis of H2H traffic volume.

FIG. 6 provides a schematic diagram providing an illustration of a communication system which dynamically allocates carriers on the basis of H2H traffic volume.

The communication system illustrated in FIG. 6 corresponds with that shown in FIG. 4a except that the control unit 401 includes a traffic monitoring unit 601. The control unit 401 is arranged to receive information from the traffic monitoring unit 601 indicative of traffic volume in the H2H communication network and based on this determine whether or not Carrier 1 should be used for the transmission of H2H or MTC data.

In one example, the traffic monitoring unit 601 is connected to the H2H core network and is arranged to monitor H2H traffic volume. If the traffic monitoring unit 601 detects that the H2H traffic volume has dropped below a threshold level for a threshold period of a time then a first traffic volume detect signal is sent to the control unit 401 from the traffic monitoring unit 601 indicating that the H2H traffic has fallen below the threshold level. The control unit 401 is then arranged to send a first dynamic carrier allocation control signal to the H2H core network 104 and the MTC core network 204. After receiving the first dynamic carrier allocation control signal the H2H core network is arranged to cease transmission of H2H data on Carrier 1. Correspondingly, after receiving the first dynamic carrier allocation control signal the MTC core network 204 is arranged to begin transmission of MTC data using Carrier 1.

The traffic monitoring unit 601 continues to monitor the H2H traffic volume. If the traffic monitoring unit detects that H2H traffic has again risen above the threshold level for more than a threshold period of time, a second traffic volume detect signal is sent to the control unit 401 from the traffic monitoring unit 601 indicating that the H2H traffic has risen above the threshold level. The control unit 401 is then arranged to send a second dynamic carrier allocation control signal to the H2H core network 104 and the MTC core network 204. After receiving the second dynamic carrier allocation control signal the MTC core network 204 is arranged to cease transmission of H2H data on Carrier 1 and the H2H core network 104 is arranged to begin transmission of MTC data using Carrier 1.

In some examples, ceasing to transmit the H2H data on carrier 1 comprises switching from transmitting data using an H2H radio access technology on carrier 1 (such as LTE) to transmitting data using an MTC radio access technology on carrier 1 (such as GPRS).

Figure 7:
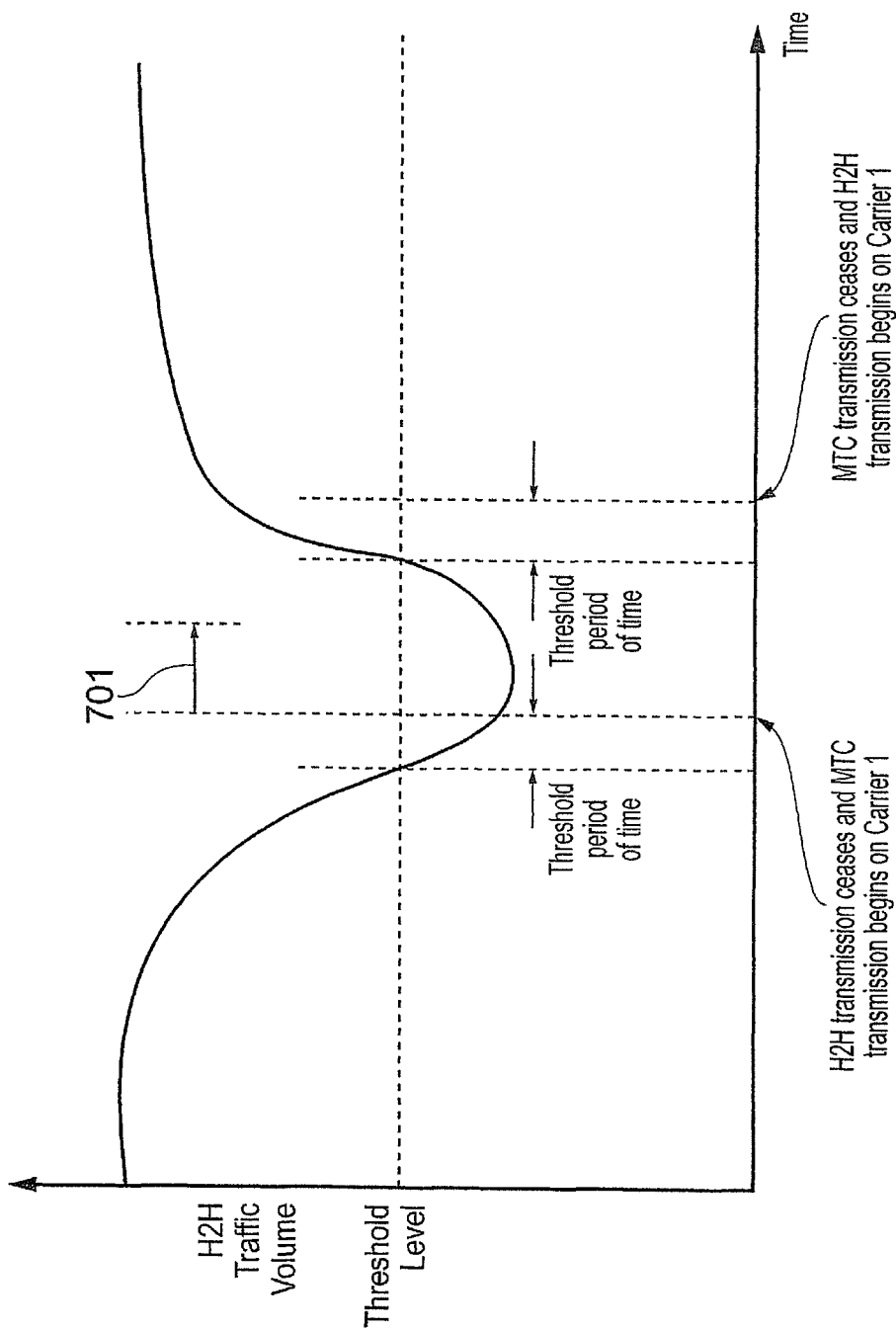
FIG. 7 provides a schematic diagram illustrating the dynamic allocation of Carrier 1 based on H2H traffic volume.

FIG. 7 provides a schematic diagram illustrating the dynamic allocation of Carrier 1 based on the H2H traffic volume.

In examples in which Carrier 1 is dynamically allocated to either H2H or MTC data transmission, the MTC network may be available for an unknown period of time. In some examples, the control unit 401 is arranged to specify a minimum persistence time 701 during which the MTC data can be transmitted on Carrier 1. The minimum persistence time 701 is then signalled to the MTC communication devices in the MTC network. Using this information, each MTC communication device can then determine whether or not it is worth transmitting any pending MTC data.

For example, if an MTC communication device has a large quantity of MTC data to transmit but the minimum persistence time indicates that the MTC network may only be available for a short period such as 30 seconds, then the control processor of the MTC communication device may determine that it is better to wait until Carrier 2 is available for MTC data transmission on a non-dynamic basis (e.g. from 0000 hrs onwards) as there is unlikely to be enough time to transmit all the data. On the other hand, if there is only a small quantity of pending MTC data, then the control processor of the MTC communication device can determine that there is enough time to transmit the data.

Carrier Handover Between MTC and H2H Communication

In the example communication systems shown in FIGS. 4a and 6, at various specified points in time Carrier 1 is switched between being used to transmit H2H data and being used to transmit MTC data. When there are a large number of H2H or MTC communication devices using the communication system, the transition from using Carrier 1 to transmit H2H data to using Carrier 1 to transmit MTC data, and vice versa, must be carefully managed to avoid abruptly loading the MTC core network and/or the H2H core network with connection requests and requests to transmit and receive data. As discussed above, switching from transmitting H2H data to transmitting MTC data may comprise switching from transmitting data using an H2H radio access technology on carrier 1 (such as LTE) to transmitting data using an MTC radio access technology on carrier 1 (such as GPRS).

For example, in accordance with the carrier allocation timing shown in FIG. 5, every day at 0000 hrs Carrier 1 becomes available for transmitting MTC data. It is therefore possible that multiple MTC communication devices may have been waiting several hours, accumulating MTC data to transmit. If, when Carrier 1 becomes available for transmitting MTC data, a large number of MTC communication device simultaneously try to connect to the MTC network to transmit MTC data, it is unlikely that the MTC radio interface and MTC core network would be able to cope.

In order to avoid this situation, in one example, each MTC communication device is constrained so as to transmit data only during specified sub-periods during the period that Carrier 1 is available for MTC data transmission.

This may be achieved in a number of ways. For example, every MTC communication device in the network could be allocated to one of five groups. MTC communication devices allocated to the first group of the five groups may be arranged to transmit MTC data only during the first six minute period of an hour period; MTC communication devices allocated to the second of the five groups may be arranged to transmit MTC data only during the second six minute period of an hour period; MTC communication devices allocated to the third group of the five groups may be arranged to transmit MTC data only during the third six minute period of an hour period, and so on. This concept is illustrated in Table 1:

TABLE 1

| Time | MTC Communication Device Group Permitted To Transmit MTC Data |
| --- | --- |
| 00.00.00 hrs-00.05.59 hrs | 1 |
| 00.06.00 hrs-00.11.59 hrs | 2 |
| 00.12.00 hrs-00.17.59 hrs | 3 |
| 00.18.00 hrs-00.23.59 hrs | 4 |
| 00.24.00 hrs-00.29.59 hrs | 5 |
| 00.30.00 hrs-00.35.59 hrs | 1 |
| 00.36.00 hrs-00.41.59 hrs | 2 |
| 00.42.00 hrs-00.47.59 hrs | 3 |
| 00.48.00 hrs-00.53.59 hrs | 4 |
| 00.54.00 hrs-00.59.59 hrs | 5 |
| 01.00.00 hrs-01.05.59 hrs | 1 |
| 01.06.00 hrs-01.11.59 hrs | 2 |
| 01.12.00 hrs-01.17.59 hrs | 3 |
| 01.18.00 hrs-01.24.59 hrs | 4 |
| . | . |
| . | . |
| . | . |

As will be understood, by restricting when each MTC communication device can transmit MTC data in this way, sudden surges in MTC data transmission requests are reduced.

In order to achieve as random as possible distribution of MTC communication devices belonging to any particular group in any one cell, the group to which the MTC communication device belongs could be determined by a unique identification code associated with each MTC communication device such as a International Mobile Subscriber Identity (IMSI) number or a Radio Network Temporary Identifier (RNTI) allocated by the network. An example is illustrated in Table 2:

TABLE 2

| Last two digits of IMSI | Communication Device Group Allocation |
| --- | --- |
| 00 to 19 | 1 |
| 20 to 39 | 2 |
| 40 to 59 | 3 |
| 60 to 79 | 4 |
| 80 to 99 | 5 |

Auto-Handover of H2H Devices Between Carriers

Another consideration is that when Carrier 1 is switched from being used to transmit H2H data to being used to transmit MTC data, all H2H communication devices currently connected to the H2H core network must be transferred from Carrier 1 to Carrier 2. Ideally this must be done in a seamless fashion so that users of the H2H communication devices are unaware of the handover. For example there should be no disruption in any voice call that is ongoing at the moment of handover. Moreover, it should also be done in such a manner that avoids overloading the H2H radio interface associated with Carrier 2 with connection requests.

In order to achieve this, in some examples an auto-handover procedure is used in which in the period of time leading up to switching from using Carrier 1 for H2H data to using it for MTC data, H2H communication devices that are currently communicating using Carrier 1 are transferred to Carrier 2 in a staggered fashion. In one example, in order to implement this a handover period is defined, for example thirty minutes before Carrier 1 is switched to MTC transmission. During this period all H2H communication devices communicating using Carrier 1 are transferred to Carrier 2. In a similar fashion to the MTC communication device transmission sub-period allocation described above, the exact time at which an individual H2H communication device transfers from communicating using Carrier 1 to Carrier 2 could be determined by a unique identification code associated with each H2H communication device such as an IMSI number or an RNTI number.

For example, each H2H communication device could be allocated to one of five groups as shown for example in Table 2. The period during which each H2H communication device transfers from Carrier 1 to Carrier 2 is then defined as shown in Table 3:

TABLE 3

| Communication Device Group Allocation | Time during which handover from Carrier 1 to Carrier 2 occurs (Carrier 1 becomes MTC at 0000 hrs) |
| --- | --- |
| 1 | 2330 hrs |
| 2 | 2336 hrs |
| 3 | 2342 hrs |
| 4 | 2348 hrs |
| 5 | 2356 hrs |

H2H/MTC Sub-Frame Allocation

In the examples described so far, the transmission of H2H data and the transmission of MTC data has been divided based on allocating different carriers to the MTC or H2H data transmission. However, in some examples, rather than dividing the transmission of MTC data and H2H data between two distinct carriers, instead the transmission of H2H data and the transmission of MTC data is divided on a single carrier on a sub-frame level.

The transmission of data in radio communications systems is typically achieved by dividing the transmission signal into a series of frames which comprise a number of sub-frame units. The structure of the frame, i.e. its length and the type of data transmitted in each sub-frame is typically predefined and is known by each mobile device.

Figure 8:
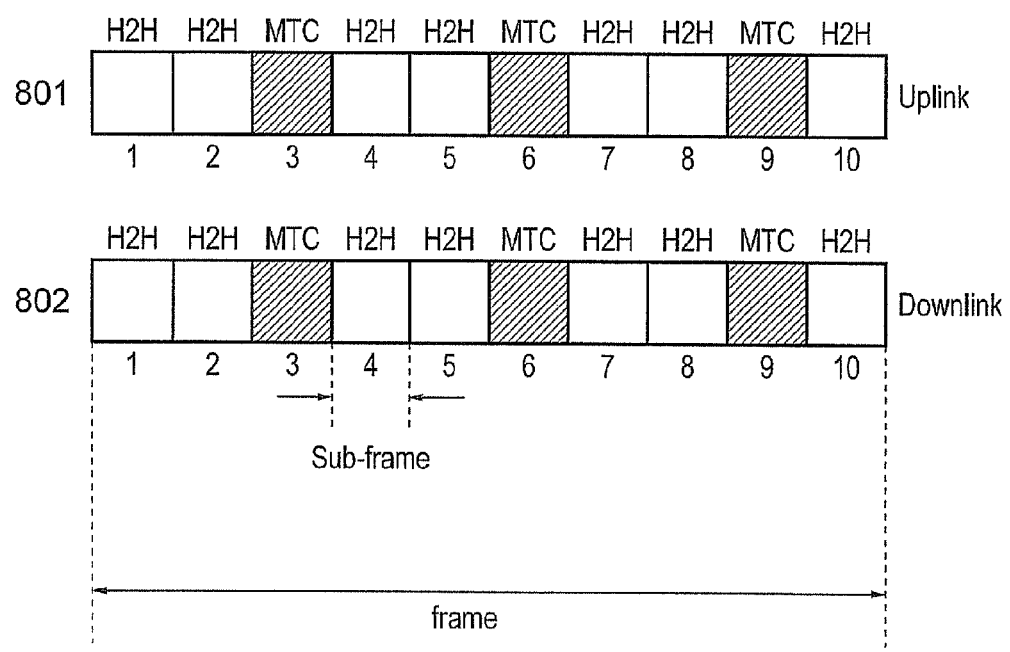
FIG. 8 shows a schematic illustration of an example uplink transmission frame and an example downlink transmission frame.

FIG. 8 shows a schematic illustration of an example uplink transmission frame 801 and a downlink transmission frame 802. Each transmission frame is divided into a number of sub-frames. The first, second, fourth, fifth, seventh, eighth and tenth sub-frame of the transmission frames are allocated for the transmission of H2H data. The third, sixth and ninth sub-frames of the transmission frames are allocated for the transmission of MTC data. In an illustrative example, each transmission frame is 10 ins long and each sub-frame is 1 Ins long.

The uplink transmission frame 801 and the downlink transmission frame 802 are shown as having the same arrangement of MTC and H2H data sub-frames. However, it will be understood that this is merely illustrative and that the uplink frame may have an arrangement of MTC data sub-frames and H2H sub-frames that are not the same.

Figure 9:
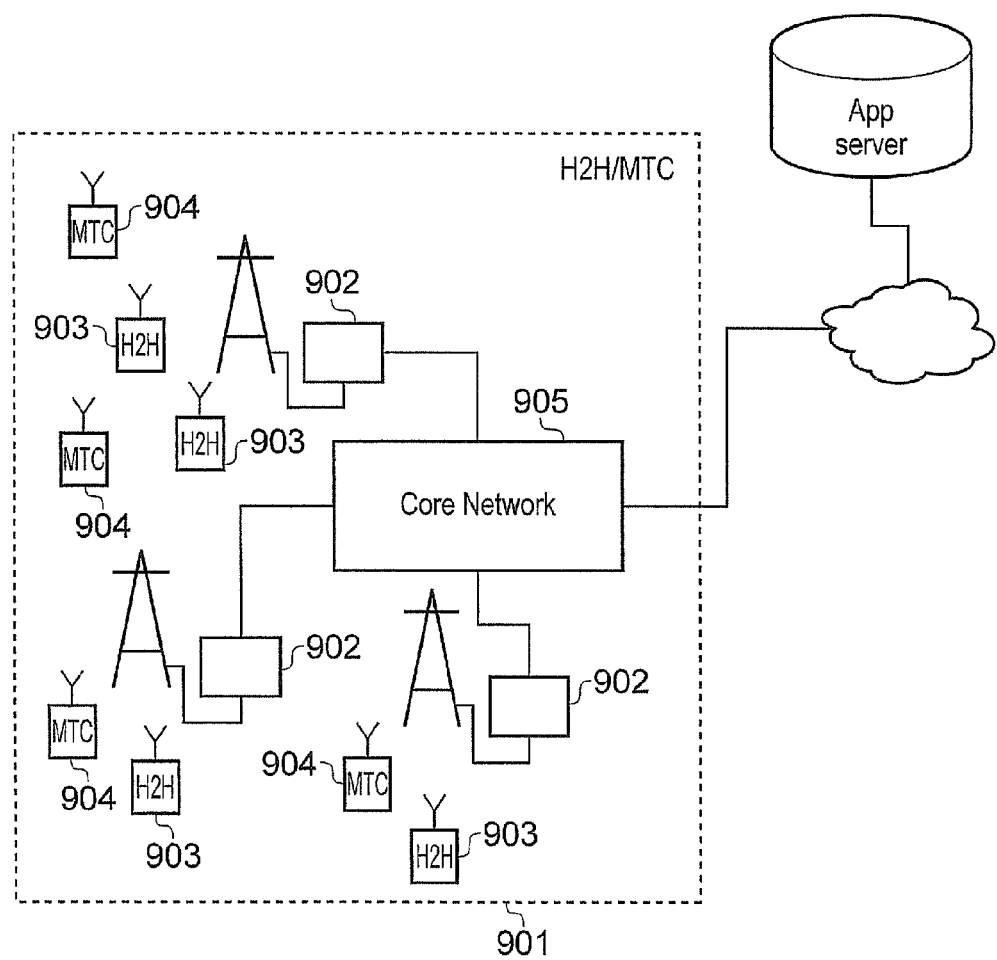
FIG. 9 provides a schematic diagram illustrating a communication system arranged to use the transmission frames shown in FIG. 8.

FIG. 9 provides a schematic diagram illustrating a communication system arranged to use the transmission frames shown in FIG. 8. Unlike the communication networks shown in FIGS. 1, 2 and 4, the example of the mobile communication network 901 shown in FIG. 9 is arranged to support both the communication of H2H data and the communication of MTC data.

FIG. 9 shows a mobile communication network 901 including a number of base stations 902 which are arranged to transmit data to a number of H2H communication devices 903 and MTC communication devices 904 on a radio downlink and receive data from the H2H communication devices 903 and MTC communication devices 904 on a radio uplink. The base stations 902 are connected to a core network 905 which routes data communicated within the network and includes functions such as authentication, mobility management, service provisioning, billing and so on.

Accordingly, as can be seen with reference to FIG. 8, during the first two sub-frames (e.g. the first two milliseconds of the uplink and downlink frames) H2H data is transmitted on the uplink and the downlink between the base stations 902 and the H2H communication devices 903. During the third sub-frame (e.g. the third millisecond of the frame) MTC data is transmitted on the uplink and the downlink between the base stations 902 and the MTC communication devices 904. During the fourth and fifth sub-frames H2H data is transmitted, during the sixth sub-frame MTC data is transmitted and so on.

In the example shown in FIG. 9, the H2H communication devices and the MTC communication devices transmit data in accordance with the same radio access technology. In other words, if for example the H2H communication devices communicate using a LTE based radio access system then MTC communication devices also communicate using a LTE based access system. However, in some examples, the MTC communication devices and the H2H communication devices are arranged to communicate using different radio access technologies. For example, the H2H communication devices may communicate using GPRS derived technology and the MTC communication devices may communicate using LTE derived technology.

Figure 10:
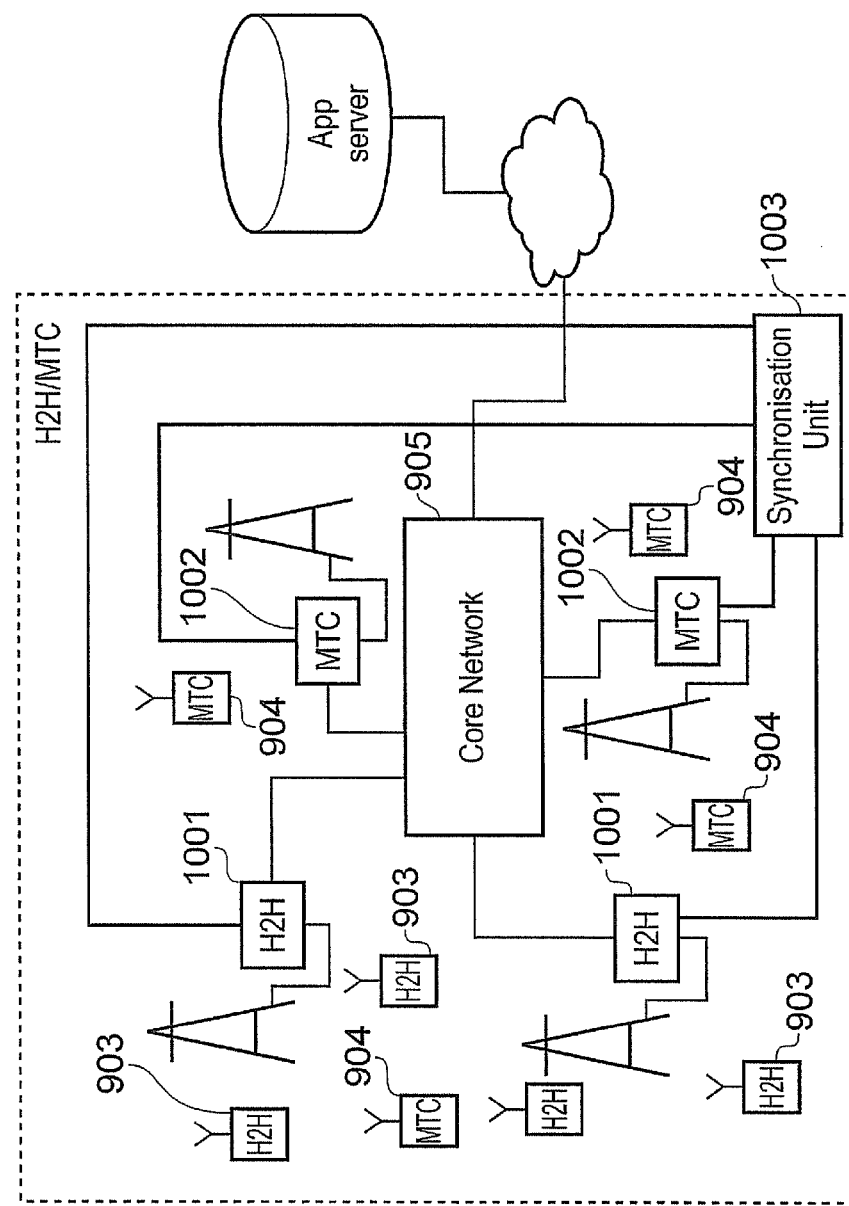
FIG. 10 shows a schematic diagram of a mobile communication network in which H2H communication devices and MTC communication devices communicate using different radio access technology whilst using the transmission frame shown in FIG. 8, and FIG. 11 provides a flow diagram illustrating a method according to an example of the invention.

FIG. 10 shows a schematic diagram of a mobile communication network in which the H2H communication devices and the MTC communication devices communicate using different radio access technology whilst using the transmission frames shown in FIG. 8. The mobile communication network shown in FIG. 10 corresponds to that shown in FIG. 9 except that rather than having base stations arranged to communicate with both the MTC communication devices and the H2H communication devices, the network instead includes dedicated H2H base stations 1001 arranged to communicate H2H data with the H2H communication devices 903 and dedicated MTC base stations 1002 arranged to communicate MTC data with MTC communication devices 904. The H2H base stations 1001 and the MTC base stations 1002 are connected to the single core network 905 which is arranged to support both radio access technologies as is known in the art. In some embodiments an H2H base station 1001 may be co-located with an MTC base station 1002 and may be located within the same unit.

In accordance with the transmission frames shown in FIG. 8, during sub-frames 1, 2, 4, 5, 7, 8 and 10 the H2H base stations 1001 communicate with the H2H communication devices 903 on the single carrier using a first radio access technology. Correspondingly, during sub-frames 3, 6 and 9 the MTC base stations 1002 communicate with the MTC communication devices 904 on the single carrier using a second radio access technology.

In order to ensure that the transmission timing of the sub-frames is matched across all the base stations, both the H2H base stations 1001 and the MTC base stations 1002 are connected to a synchronisation unit 1003. The synchronisation unit 1003 provides the base stations with timing information to aid the base stations in staying synchronised to the transmission frames. In FIG. 10 the synchronisation unit 1003 is shown located outside of the core network 905 although as will be understood, the synchronisation can be located in any suitable location such as within the core network 905. In an embodiment where the H21-1 and MTC are co-located, synchronisation may occur over a local interface.

Adapted Synchronisation Signals

In order for the communication systems shown in FIGS. 9 and 10 to operate, the control processor of each communication device needs to be aware of the frame structure of both the uplink and downlink frames that dictates which of the sub-frames are reserved for H2H data transmission and which are reserved for MTC data transmission.

In conventional mobile communication systems each downlink frame typically includes a synchronisation signal. The synchronisation signal usually comprises a predetermined sequence which is known by each mobile device in the network. Whenever a new mobile device joins the network, for example when it is switched on, the mobile device monitors a predetermined carrier for the synchronisation signal. Once this synchronisation signal is detected, the mobile device can synchronise to the frame structure and thus become aware of when to transmit and receive data.

In order to make the communication devices in the communication system shown in FIGS. 9 and 10 aware of the structure of the uplink and downlink transmission frames, an adapted synchronisation signal can be transmitted which as well as including a predefined synchronisation sequence, also includes uplink and downlink frame structure information indicating which of the sub-frames of the uplink and downlink transmission frames are allocated for H2H data transmission and which are allocated for MTC data transmission.

In the communication system shown in FIG. 9, the H2H communication devices and the MTC communication devices communicate using the same radio access technology. As a result, both the H2H communication devices and the MTC communication devices can receive all sub-frames of the downlink transmission frame. Accordingly, the adapted synchronisation signal can be inserted on any of the sub-frames of the downlink transmission frame, for example the first sub-frame (sub-frame 1) of the downlink transmission frame 802 shown in FIG. 8. However in some examples, there may be a separate H2H synchronisation signal and a separate MTC synchronisation signal.

On the other hand, in the communication system shown in FIG. 10 the H2H communication devices communicate using a different radio access technology to the MTC communication devices. Accordingly, the H2H sub-frames cannot be received by the MTC communication devices and the MTC sub-frames cannot be received by the H2H communication devices. Therefore, in order to enable the communication devices to be aware of the uplink and downlink transmission frame structures, part of one of the H2H sub-frames of the downlink transmission frame includes a first adapted synchronisation signal which includes uplink and downlink frame structure information indicating which of the sub-frames of the downlink frame and uplink frame are allocated for H2H data transmission. Correspondingly, part of one of the MTC sub-frames of the downlink transmission frame includes a second adapted synchronisation signal which includes uplink and downlink frame structure information indicating which of the sub-frames of the downlink frame and uplink frame are allocated for MTC data transmission. In other words, there is a separate adapted synchronisation signal for MTC data transmission and a separate adapted synchronisation signal for H2H data transmission.

Accordingly, when a new H2H communication device 903 joins the network, it monitors the downlink part of the carrier until the H2H synchronisation signal is detected. When the H2H synchronisation signal is detected, the H2H communication device decodes the frame structure information and thus determines during which sub-frames H2H data can be transmitted on the uplink and received on the downlink.

Correspondingly, when a new MTC communication device 904 joins the network, it monitors the downlink part of the carrier until the MTC synchronisation signal is detected. When the MTC synchronisation signal is detected, the MTC communication device decodes the frame structure information and thus determines during which sub-frames MTC data can be transmitted on the uplink and received on the downlink.

In some examples, rather than the frame information being transmitted on an adapted synchronisation signal, the frame information may instead be transmitted on a broadcast channel such as a 3GPP BCH type channel.

In some examples, a specific sub-frame, the position of which is known at each MTC communication device, may be allocated for the transmission of MTC frame information and the same, or another sub-frame the position of which is known at each H2H communication device may be allocated for the transmission of H2H frame information.

Sub-frame Allocation Variation

As can be seen from FIG. 8, the proportion of radio resources dedicated to MTC data communication and the proportion of radio resources dedicated to H2H data communication can be determined by the number of sub-frames allocated to H2H data and the number of sub-frames allocated to MTC data. For example, in the uplink transmission frame 801 and the downlink transmission frame 802 shown in FIG. 8, seven sub-frames are allocated for H2H data transmission and three sub-frames are allocated for MTC data transmission. Accordingly, 70% of the radio resources can be considered to be allocated to H2H data transmission and 30% allocated to MTC data transmission. In some examples, this proportion can be varied on a frame-by frame basis. To achieve this, the frame structure information transmitted by the core network with the synchronisation/broadcast BCH-type signal can be changed to reflect an increased/decreased number of sub-frames dedicated to H2H or MTC data transmission. In some examples a scheduling unit may be arranged to alter the frame structure to vary the proportion of radio resources allocated to H2H data transmission and MTC data transmission in accordance with various criteria.

For example, in the macro level time domain multiplexing examples discussed above, rather than implement a "hard" switch between Carrier 1 being used for H2H data transmission and MTC data transmission at certain times (for example as a result of predefined criteria such as the frequency allocation scheme of FIG. 5 or the dynamic allocation shown in FIG. 7), the control unit 401 includes a scheduling unit which varies the proportion of sub-frames allocated to H2H and MTC data transmission on Carrier 1. For example, during the period 0000 hrs to 0559 hrs the uplink transmission frame and downlink transmission frame may have only one sub-frame allocated to H2H data transmission and nine sub-frames allocated to MTC data transmission. On the other hand, during the period 0600 hrs to 2359 hrs the uplink and downlink transmission frames may have only one sub-frame allocated to MTC data transmission and nine frames allocated to H2H data transmission.

In some examples the ARQ (automatic repeat request) cycles for the MTC and H2H networks may need to be modified such that the signalling falls within the appropriate sub-frames. For example an MTC ARQ cycle may need to be modified such that any data transmitted to the MTC communication device in the first MTC sub-frame is acknowledged in the next MTC sub-frame.

Sub-Frame Radio Access Technology Variation

In the communication system shown FIG. 10 the MTC data and the H2H data is transmitted using different radio access technologies. However, in some examples rather than using a completely different radio access technology to transmit the different types of data, during MTC sub-frames, the MTC data is transmitted using a modified version of the radio access technology used to transmit the H2H data.

For example, if the H2H data is transmitted using conventional LTE radio access technology, during MTC sub-frames in the downlink each OFDM symbol could include a lengthened cyclic prefix (i.e. guard interval).

As is well known in the art, lengthening the cyclic prefix of an OFDM symbol increases the tolerance at the receiver to inter-symbol interference caused by multipath propagation phenomena. By increasing the tolerance to multipath interference, the distance from which the receiver (i.e. the MTC communication device) can satisfactorily receive OFDM symbols transmitted from the transmitter (i.e. the MTC base station) is increased. Thus by adapting the transmission of MTC OFDM symbols in this way the range at which MTC communication devices can receive MTC data is increased.

Lengthening the cyclic prefix is achieved at the cost of the amount of data that can be transmitted in each symbol. However, as explained previously, MTC data is typically characterised by the quantities of data that are actually transmitted being relatively small (compared, for example with H2H data). Accordingly, sacrificing the amount of data that can be transmitted per symbol to increase the range over which the MTC data can be transmitted is acceptable for MTC data.

In other examples, during MTC sub-frames the proportion of the radio resources dedicated to random access requests may be increased during MTC sub-frames.

As is known, in many conventional mobile telecommunication systems, when data is to be transmitted from a mobile device to the network, the mobile device must first request access to the uplink radio resources that will enable the data to be transmitted to the network. The point in time at which a mobile device will request access to the uplink resources cannot be predicted and so such requests are termed "random access" requests. In many radio interfaces, a certain proportion of uplink radio resources are set aside to accommodate these random access requests.

As explained above, the transmission of MTC data is typically characterised by the frequent transmission of small quantities of data. Accordingly, for any given total of MTC data transmitted within a communication network, the total number of random access requests may be expected to be greater than the total number of random access requests made as a result of the transmission of the same quantity of H2H data. Accordingly, if high volumes of MTC data are transmitted, this could result in the random access radio resources being overwhelmed leading to a substantial reduction in the quality of service available for the transmission of MTC data. Therefore, by increasing the proportion of the radio resources available for random access requests during MTC sub-frames, the communication of large quantities of MTC data is better served.

In some examples increasing the resources available for random access requests might include increasing the number of timeslots, frequency bandwidth, number of sub-carriers or transmission codes allocated to a physical random access channel.

In the examples described above in which the MTC data is transmitted using a different radio access technology to that used to transmit the H2H data, the MTC network could use a different number of carriers to the H2H network. For example, the H2H network could be a 10 MHz bandwidth LTE network and the MTC network could consist of two 5 MHz bandwidth (3.84 Mcps) TC-CDMA carriers or two 5 MHz WCDMA carriers.

Figure 11:
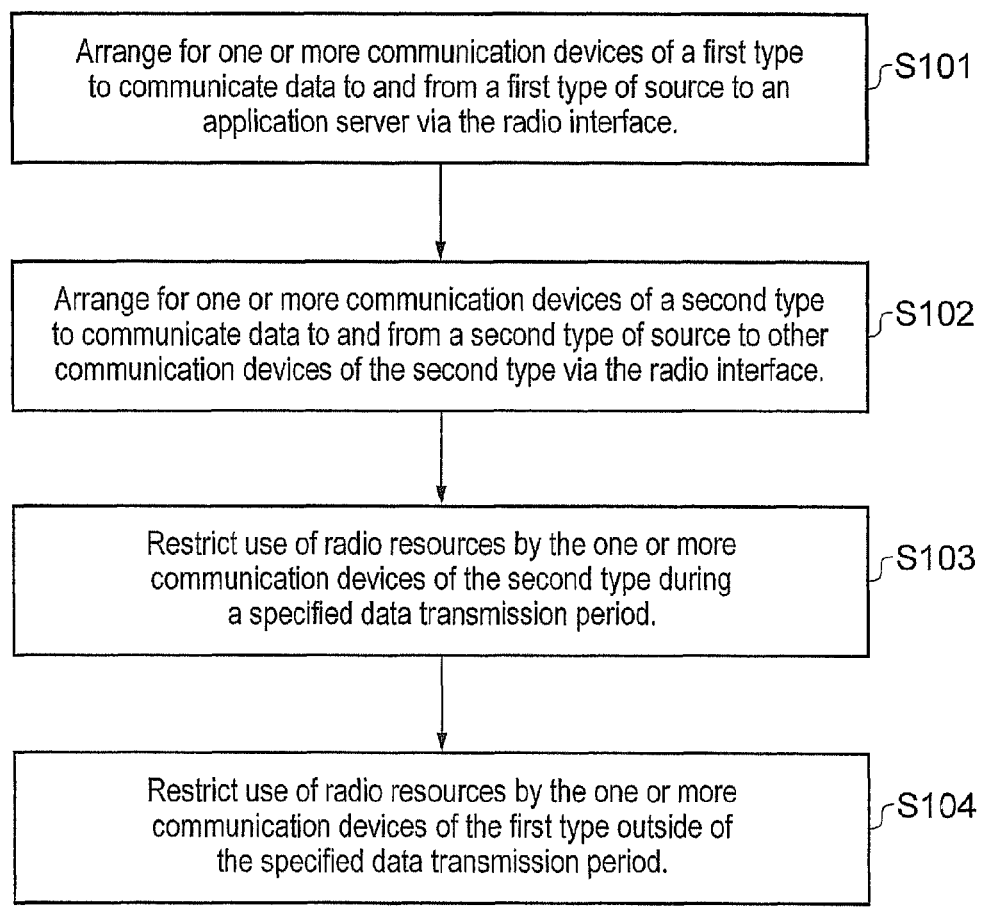

FIG. 11 provides a flow diagram illustrating a method in accordance with an embodiment of the invention.

At step S101 communication devices of a first type are arranged to communicate data to and from a first type of source to an application server via the radio interface. At step S102, communication devices of a second type are arranged to communicate data to and from a second type of source to an application server via the radio interface. At step S103 use of the radio resource by the one or more communication devices of the second type is restricted during a specified data transmission period. At step S104 use of the radio resource by the one or more communication devices of the first type is restricted. outside of the specified data transmission period.

Various modifications may be made to the embodiments herein before described. For example it will be understood that the particular component parts of which network components and communication devices described above are comprised are essentially logical designations. Accordingly, the functionality that these component parts provide may be manifested in ways that do not conform precisely to the forms described above and shown in the diagrams. For example aspects of the invention be implemented in the form of a computer program product comprising instructions that may be implemented on a processor stored on a data carrier such as a floppy disk, optical disk, hard disk, PROM, RAM, flash memory or any combination of these or other storage media, or transmitted via data signals on a network such as an Ethernet, a wireless network, the Internet, or any combination of these or other networks, or realised in hardware as an ASIC (application specific integrated circuit) or an FPGA (field programmable gate array) or other configurable or bespoke circuit suitable to use in adapting the conventional equivalent device.

The invention claimed is:

1. A method of operating a wireless communication system, the method comprising:
    arranging for one or more machine type communication (MTC) devices to communicate MTC data via a radio interface by using radio resources of the radio interface, the radio resources including an uplink and a downlink of a first radio carrier of the radio interface;
    arranging for one or more human-to-human (H2H) devices to communicate H2H data via the radio interface;
    monitoring a volume of the H2H data transmitted via the first radio carrier;
    determining a duration of a specified data transmission period based on the volume of the H2H data transmitted via the radio interface, the specified transmission period being a period in which transmission of H2H data is restricted;
    transmitting the duration of the specified data transmission period to the one or more MTC devices;
    restricting use of the radio resources by the one or more H2H devices during the specified data transmission period by allocating more of the radio resources to the one or more MTC devices than to the one or more H2H devices;
    restricting use of the radio resources by the one or more MTC devices outside of the specified data transmission period by allocating more of the radio resources outside of the specified data transmission period to the one or more H2H devices than to the MTC devices; and
    transmitting, during a predefined handover period of time prior to a start time of the specified data transmission period, an indication to the one or more H2H devices that the one or more H2H devices are to cease transmission of the H2H data on the first radio carrier during the specified data transmission period and to transmit the H2H data on a second radio carrier during the specified data transmission period, wherein
    at least one of the one or more MTC devices determines whether to transmit MTC data during the specified data transmission period based on the duration of the specified data transmission period and a size of the MTC data.

2. The method according to claim 1, wherein the start time is a predetermined time based on predicted levels of H2H data transmission.

3. The method according to claim 2, wherein each MTC device is allocated one or more specific sub-periods during the specified data transmission period within which to transmit the MTC data.

4. The method according to claim 1, wherein when the one or more H2H devices are part of a plurality of H2H devices,
    the plurality of H2H devices are divided into a plurality of groups, and
    each group of H2H devices ceases transmission of the H2H data on the first radio carrier and transmits the H2H data on the second radio carrier at a different point in time during the handover period.

5. The method according to claim 1, further comprising dynamically determining the start time based on whether the volume of the H2H data transmitted to and from the H2H devices has fallen below a threshold for more than a threshold period of time.

6. The method according to claim 5, wherein an end time at which the specified data transmission period ends is based on the start time and the determined duration of the specified data transmission period.

7. The method according to claim 1, wherein
    the radio resources comprise one or more sub-frames of an uplink transmission frame with which data is transmitted from the one or more H2H and MTC devices on the radio interface and one or more sub-frames of a downlink transmission frame with which data is transmitted to the one or more H2H and MTC devices on the radio interface,
    the specified data transmission period comprises sub-frames during which the MTC data is transmitted, and
    the period outside the specified data transmission period comprises sub-frames during which the H2H data is transmitted.

8. The method according to claim 7, wherein a structure of the uplink transmission frame and a structure of the downlink transmission frame is signaled to the MTC devices and the H2H devices in a frame synchronization signal or a broadcast signal.

9. The method according to claim 1, wherein the H2H devices and the MTC devices are arranged to communicate data using different radio access technologies.

10. The method according to claim 1, wherein the duration of the specified data transmission period is based on predicted levels of H2H data transmission.

11. The method according to claim 1, wherein
    the one or more H2H devices are part of a plurality of H2H devices, and
    the plurality of H2H devices are controlled to cease transmission on the first radio carrier and to transmit the H2H data on the second radio carrier in a staggered fashion.

12. A radio communication system, comprising:
    control circuitry configured to
        provide a radio interface with radio resources including a first radio carrier, the first radio carrier including an uplink of the radio interface and a downlink of the radio interface; and
        support one or more machine type communication (MTC) devices to communicate MTC data via the radio interface;
        support one or more human-to-human (H2H) devices to communicate H2H data via the radio interface;
        monitor a volume of the H2H data transmitted via the first radio carrier;
        determine a duration of a specified data transmission period based on the volume of the H2H data transmitted via the radio interface, the specified transmission period being a period in which transmission of H2H data is restricted;
        transmit the duration of the specified data transmission period to the one or more MTC devices;
        restrict use of the radio resources by the one or more H2H devices during the specified data transmission period by allocating more of the radio resources to the one or more MTC devices than to the one or more H2H devices;

restrict use of the radio resources by the one or more MTC devices outside of the specified data transmission period by allocating more of the radio resources outside of the specified data transmission period to the one or more H2H devices than to the one or more MTC devices; and transmit, during a predefined handover period of time prior to a start time of the specified data transmission period, an indication to the one or more H2H devices that the one or more H2H devices are to cease transmission of the H2H data on the first radio carrier during the specified data transmission period and to transmit the H2H data on a second radio carrier during the specified data transmission period, wherein at least one of the one or more MTC devices determines whether to transmit MTC data during the specified data transmission period based on the duration of the specified data transmission period and a size of the MTC data.

13. The radio communication network according to claim 12, wherein the start time is a predetermined time based on predicted levels of H2H data transmission.

14. The radio communication network according to claim 13, wherein each MTC device is allocated one or more specific sub-periods during the specified data transmission period within which to transmit the MTC data.

15. The radio communication network according to claim 12, wherein the one or more H2H devices are part of a plurality of H2H devices, the plurality of H2H devices are divided into a plurality of groups, and each group of H2H devices ceases transmission of the H2H data on the first radio carrier and instead transmits the H2H data on the second radio carrier at a different point in time during the handover period.

16. The radio communication network according to claim 12, wherein the control circuitry dynamically determines the start time based on whether the volume of the H2H data transmitted to and from the H2H devices has fallen below a threshold for more than a threshold period of time.

17. The radio communication network according to claim 16, wherein the control circuitry determines an end time at which the specified data transmission period ends based on the start time and the determined duration of the specified data transmission period.

18. The radio communication network according to claim 12, wherein the radio resources comprise one or more sub-frames of an uplink transmission frame with which data is transmitted from the one or more H2H and MTC devices on the radio interface and one or more sub-frames of a downlink transmission frame with which data is transmitted to the one or more H2H and MTC devices on the radio interface, the specified data transmission period comprises sub-frames during which the MTC data is transmitted, and the period outside the specified data transmission period comprises sub-frames during which the H2H data is transmitted.

19. The radio communication network according to claim 18, wherein a structure of the uplink transmission frame and a structure of the downlink transmission frame is signaled to the MTC devices and the H2H devices in a frame synchronization signal or a broadcast signal.

20. The radio communication network according to claim 12, wherein the H2H devices and the MTC devices are arranged to communicate data using different radio access technologies.

21. The radio communication system according to claim 12, wherein the duration of the specified data transmission period is based on predicted levels of H2H data transmission.

22. The radio communication system according to claim 12, wherein the one or more H2H devices are part of a plurality of H2H devices, and the control circuitry controls the plurality of H2H devices to cease transmission on the first radio carrier and to transmit the H2H data on the second radio carrier in a staggered fashion.

23. A radio communication system, comprising:

control circuitry configured to provide a radio interface with radio resources including a first radio carrier, the first radio carrier including an uplink of the radio interface and a downlink of the radio interface; and support one or more machine type communication (MTC) devices to communicate MTC data via the radio interface;

support one or more human-to-human (H2H) devices to communicate H2H data via the radio interface;

monitor a volume of the H2H data transmitted via the first radio carrier;

determine a duration of a specified data transmission period based on the volume of the H2H data transmitted via the radio interface, the specified transmission period being a period in which transmission of H2H data is restricted and comprising sub-frames during which MTC data is transmitted;

transmit the duration of the specified data transmission period to the one or more MTC devices;

restrict use of the radio resources by the one or more H2H devices during the specified data transmission period by allocating more of the radio resources to the one or more MTC devices than to the one or more H2H devices;

restrict use of the radio resources by the one or more MTC devices during a period outside of the specified data transmission period by allocating more of the radio resources outside of the specified data transmission period to the one or more H2H devices than the MTC devices; and transmit, during a predefined handover period prior to a start time of the specified data transmission period, an indication to the one or more H2H devices that the one or more H2H devices are to cease transmission of the H2H data on the first radio carrier during the specified data transmission period and to transmit the H2H data on a second radio carrier during the specified data transmission period, wherein the radio resources comprise one or more sub-frames of an uplink transmission frame with which data is transmitted from the one or more H2H and MTC devices on the radio interface and one or more sub-frames of a downlink transmission frame with which data is transmitted to the one or more H2H and MTC devices on the radio interface, and at least one of the one or more MTC devices determines whether to transmit MTC data during the specified data transmission period based on the duration of the specified data transmission period and a size of the MTC data.

24. The radio communication system according to claim 23, wherein the duration of the specified data transmission period is based on predicted levels of H2H data transmission.

25. The radio communication system according to claim 24, wherein each MTC device is allocated one or more specific sub-periods during the specified data transmission period within which to transmit the MTC data.

26. The radio communication system according to claim 24, wherein the control circuitry dynamically determines the start time based on whether the volume of the H2H data transmitted to and from the H2H devices has fallen below a threshold for more than a threshold period of time.

27. The radio communication system according to claim 26, wherein the control circuitry determines an end time at which the specified data transmission period ends based on the start time and the determined duration of the specified data transmission period.

28. The radio communication system according to claim 23, wherein when the one or more H2H devices are part of a plurality of H2H devices, the plurality of H2H devices are divided into a plurality of groups, and each group of H2H devices ceases transmission of the H2H data on the first radio carrier and instead transmits the H2H data on the second radio carrier at a different point in time during the handover period.

29. The radio communication system according to claim 23, wherein a structure of the uplink transmission frame and a structure of the downlink transmission frame is signaled to the MTC devices and the H2H devices in a frame synchronization signal or a broadcast signal.

30. The radio communication system according to claim 23, wherein the H2H devices and the MTC devices are arranged to communicate data using different radio access technologies.

31. The radio communication system according to claim 23, wherein the one or more H2H devices are part of a plurality of H2H devices, and the control circuitry controls the plurality of H2H devices to cease transmission on the first radio carrier and to transmit the H2H data on the second radio carrier in a staggered fashion.

* * * * *